(12) United States Patent
Jung et al.

(10) Patent No.: US 12,392,544 B2
(45) Date of Patent: Aug. 19, 2025

(54) VACUUM ADIABATIC BODY AND FABRICATION METHOD FOR THE SAME

(71) Applicant: LG ELECTRONICS INC., Seoul (KR)

(72) Inventors: Wonyeong Jung, Seoul (KR); Deokhyun Youn, Seoul (KR); Bongjin Kim, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 18/034,807

(22) PCT Filed: Nov. 1, 2021

(86) PCT No.: PCT/KR2021/015549
§ 371 (c)(1),
(2) Date: May 1, 2023

(87) PCT Pub. No.: WO2022/095957
PCT Pub. Date: May 5, 2022

(65) Prior Publication Data
US 2023/0408178 A1 Dec. 21, 2023

(30) Foreign Application Priority Data

Nov. 2, 2020 (KR) .......................... 10-2020-0144737
Nov. 2, 2020 (KR) .......................... 10-2020-0144741
Nov. 2, 2020 (KR) .......................... 10-2020-0144764

(51) Int. Cl.
*F25D 23/06* (2006.01)
(52) U.S. Cl.
CPC ........ *F25D 23/065* (2013.01); *F25D 2201/14* (2013.01)

(58) Field of Classification Search
CPC ................................................ F25D 2201/14
See application file for complete search history.

(56) References Cited

U.S. PATENT DOCUMENTS

| | | | |
|---|---|---|---|
| 6,705,145 B1 * | 3/2004 | Ohmae | B21D 5/08 72/379.2 |
| 10,941,974 B2 | 3/2021 | Jung et al. | |

(Continued)

FOREIGN PATENT DOCUMENTS

| | | | |
|---|---|---|---|
| JP | 2751173 B2 | 5/1998 | |
| JP | H 11-11454 A | 1/1999 | |

(Continued)

OTHER PUBLICATIONS

International Search Report (with English Translation) and Written Opinion dated Feb. 16, 2022 issued in Application No. PCT/KR2021/015549.

*Primary Examiner* — Daniel J Rohrhoff
(74) *Attorney, Agent, or Firm* — KED & ASSOCIATES, LLP

(57) ABSTRACT

A vacuum adiabatic body includes a first plate, a second plate, and a seal for sealing the first plate and the second plate to provide a vacuum space. Optionally, the vacuum adiabatic body includes a side plate extending in a height direction of the vacuum space. Optionally, the vacuum adiabatic body includes a supporter for maintaining the vacuum space. Optionally, the vacuum adiabatic body includes a heat transfer resistor for reducing heat transfer between the first plate and the second plate. Optionally, the vacuum adiabatic body includes a component coupler connected to at least one of the first and second plates and to which a component is coupled. Optionally, the second plate and the side plate are provided as one body by a single body. Thus, the productivity of the vacuum adiabatic body is improved.

20 Claims, 17 Drawing Sheets

(56) References Cited

U.S. PATENT DOCUMENTS

| | | | |
|---|---|---|---|
| 11,137,201 B2 | 10/2021 | Jung et al. | |
| 2003/0041612 A1* | 3/2003 | Piloni | F16L 59/065 62/277 |
| 2013/0216791 A1* | 8/2013 | DeVos | B32B 15/013 428/179 |
| 2015/0344173 A1* | 12/2015 | Kojima | B65D 81/3813 428/34.1 |
| 2016/0288186 A1* | 10/2016 | Ito | B21D 11/08 |
| 2016/0296989 A1* | 10/2016 | Nishimura | B21D 53/88 |
| 2017/0122627 A1* | 5/2017 | Kerstner | F25B 21/04 |
| 2019/0063819 A1* | 2/2019 | Allard | F25D 23/02 |
| 2019/0247956 A1* | 8/2019 | Azuma | B23K 26/1476 |
| 2020/0191318 A1* | 6/2020 | Yuasa | B32B 19/02 |
| 2020/0348073 A1* | 11/2020 | Hunter | F25D 23/065 |
| 2021/0019197 A1* | 1/2021 | Tamir | H04L 63/0236 |
| 2022/0165702 A1* | 5/2022 | Haupt | H01L 24/75 |
| 2024/0019073 A1* | 1/2024 | Jung | F16L 59/08 |

FOREIGN PATENT DOCUMENTS

| | | |
|---|---|---|
| JP | 2011-174602 A | 9/2011 |
| KR | 10-2017-0016239 A | 2/2017 |
| KR | 10-2017-0016241 A | 2/2017 |
| WO | WO 87/05651 | 9/1987 |

* cited by examiner

[Fig. 1]
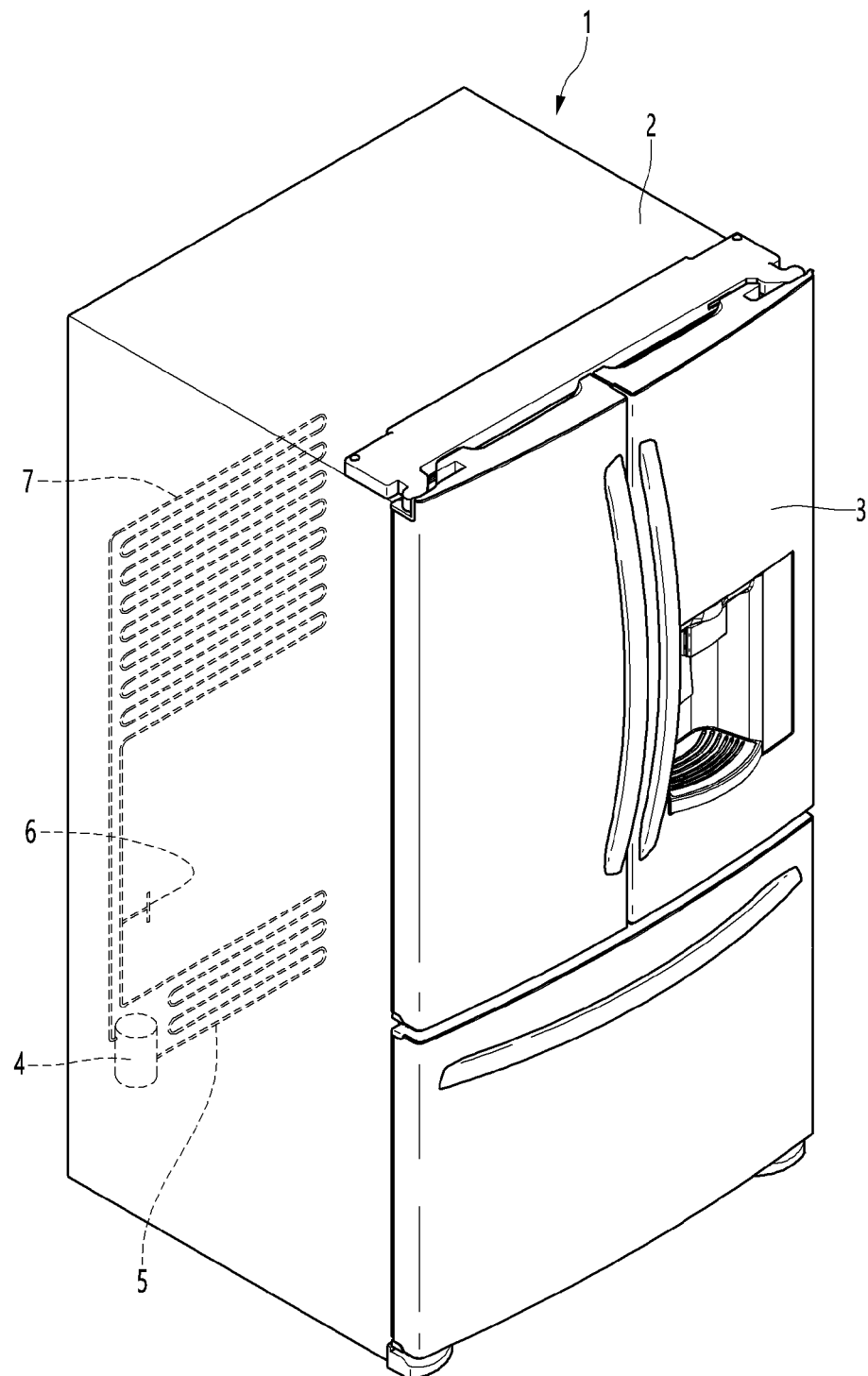

[Fig. 2]
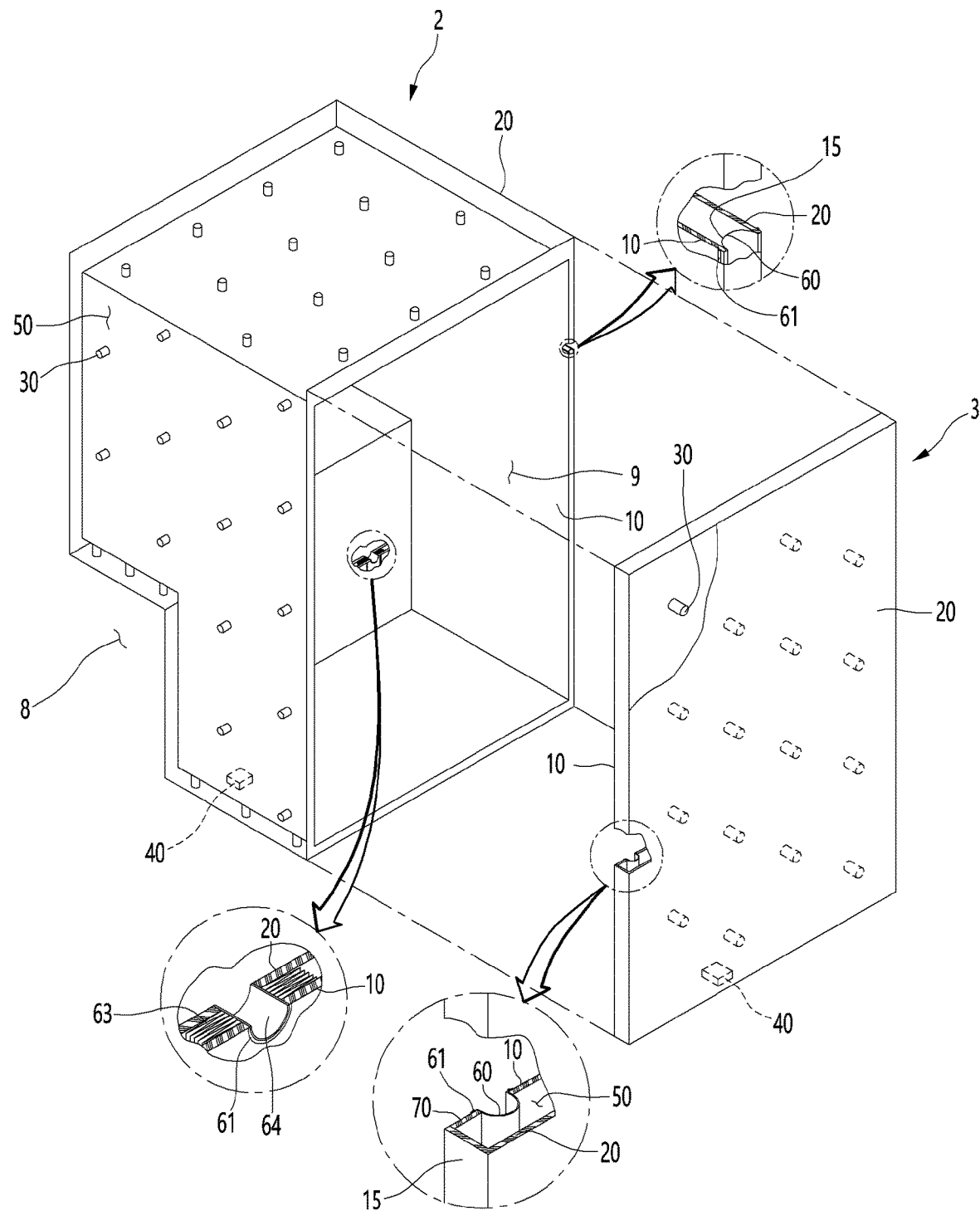

[Fig. 3]
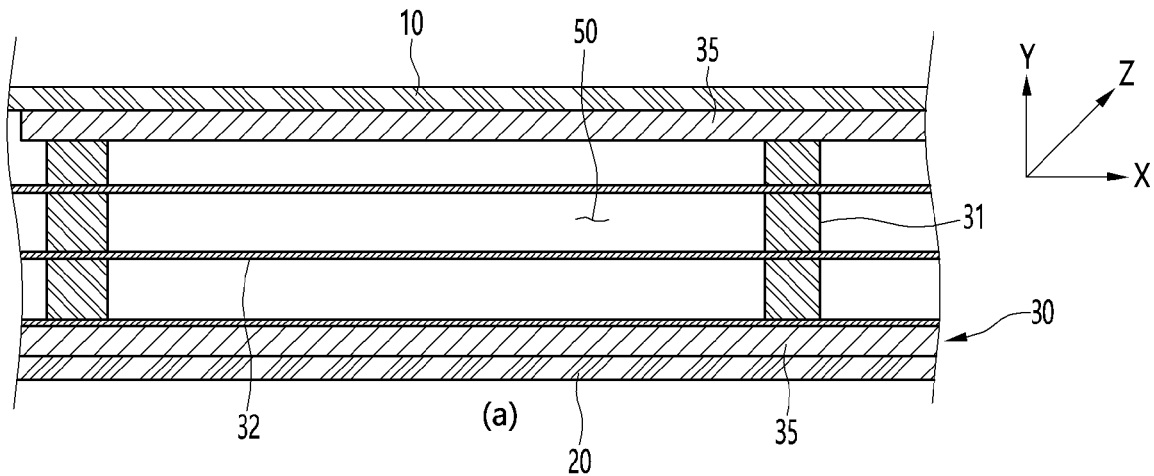
(a)
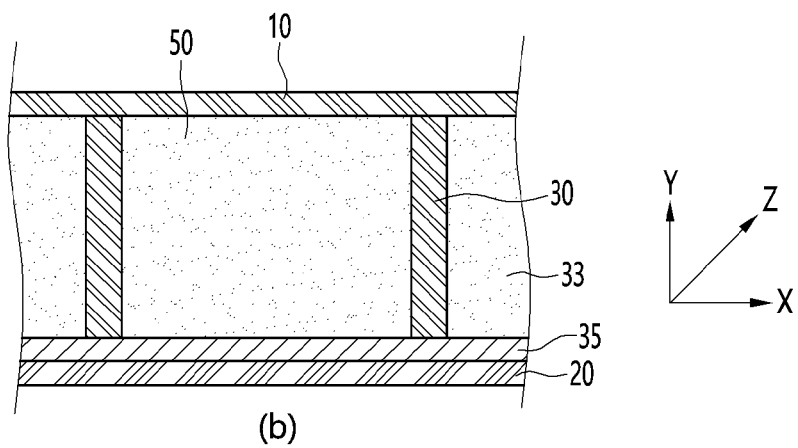
(b)
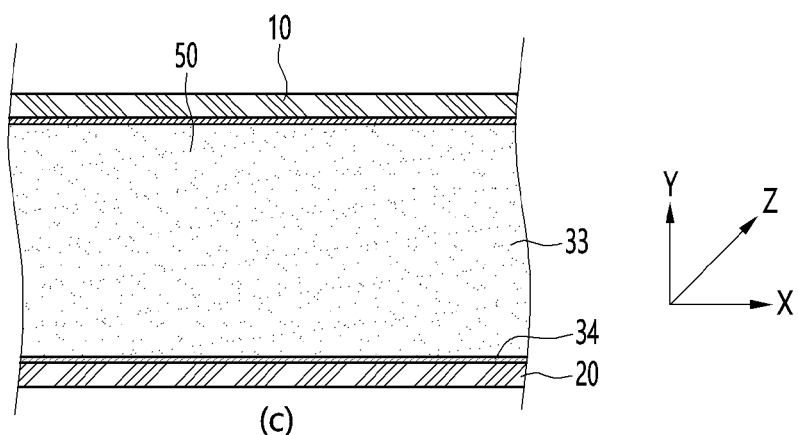
(c)

[Fig. 4]
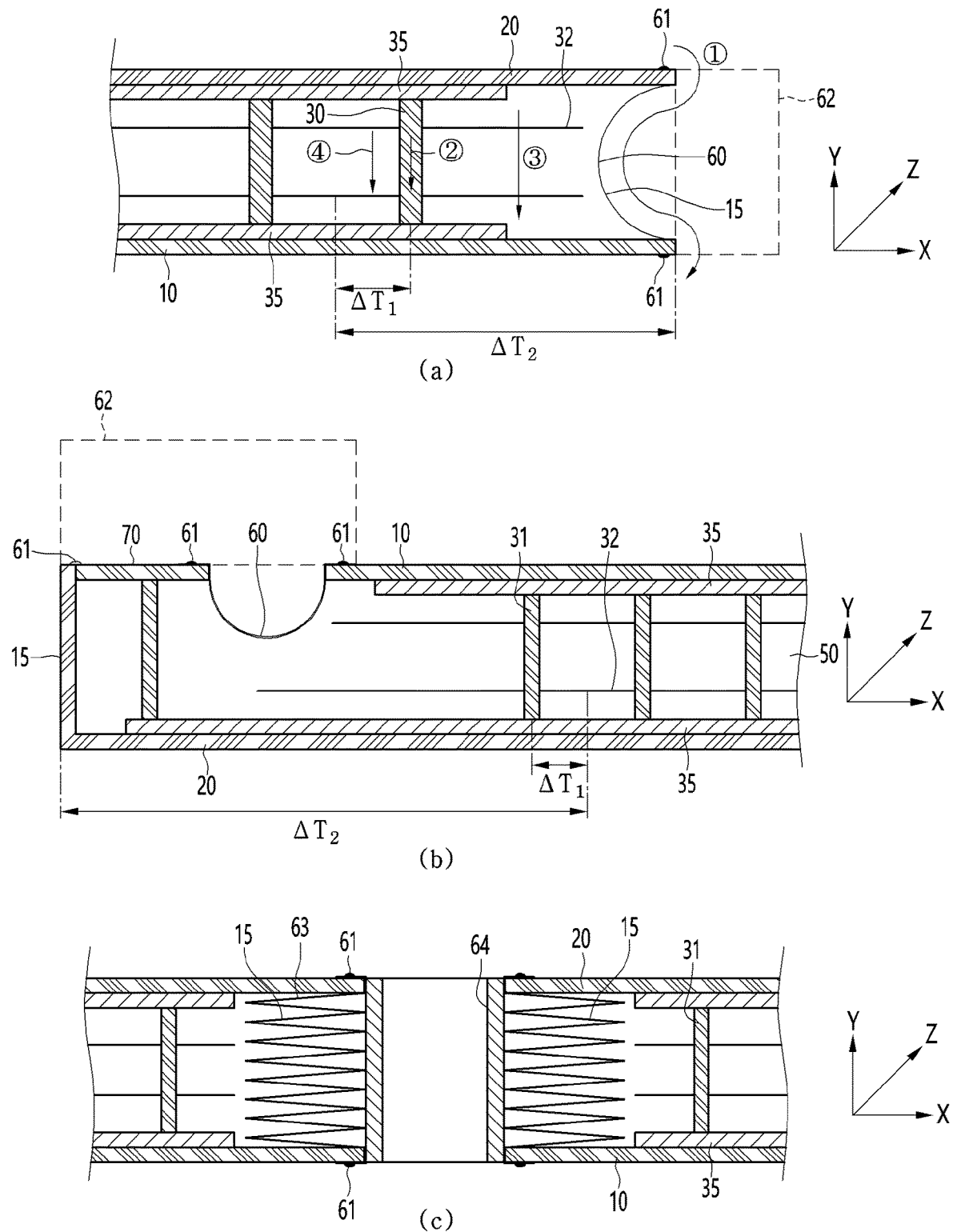

[Fig. 5]
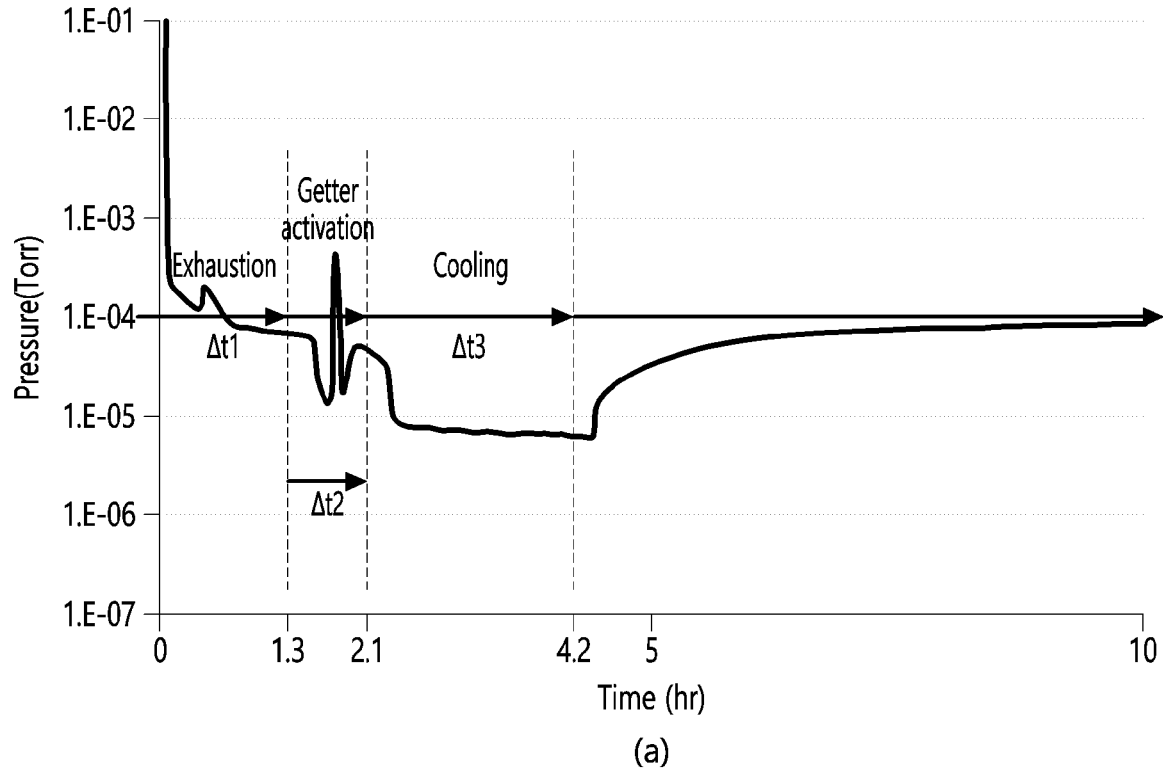
(a)
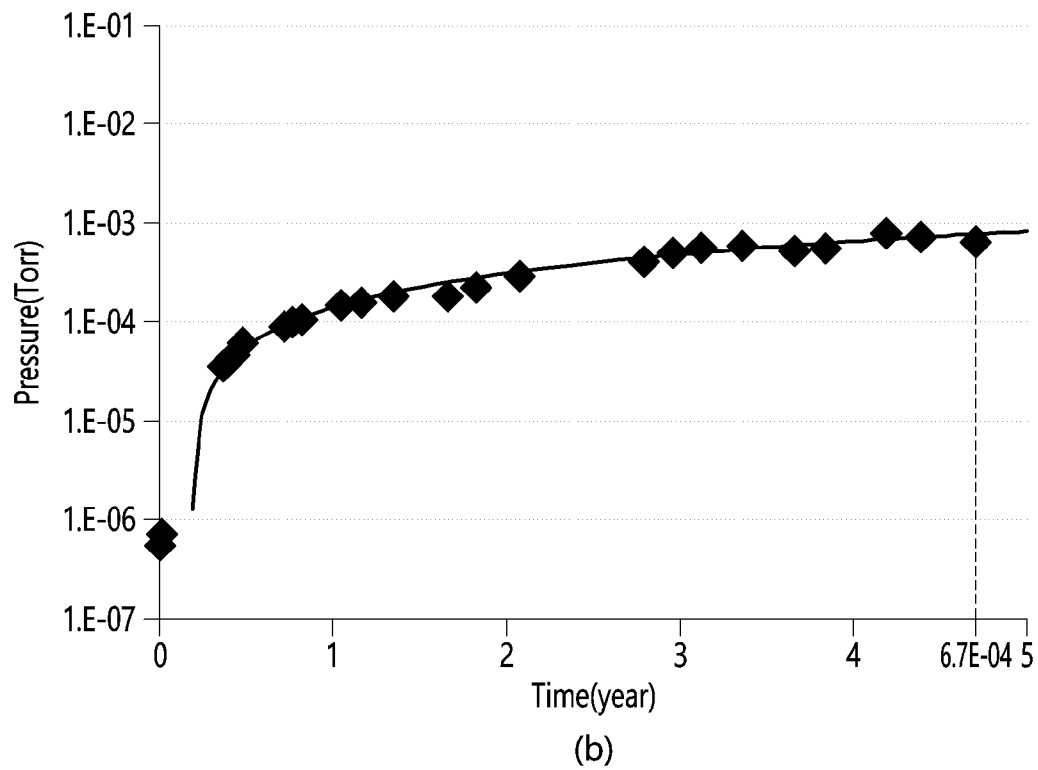
(b)

[Fig. 6]
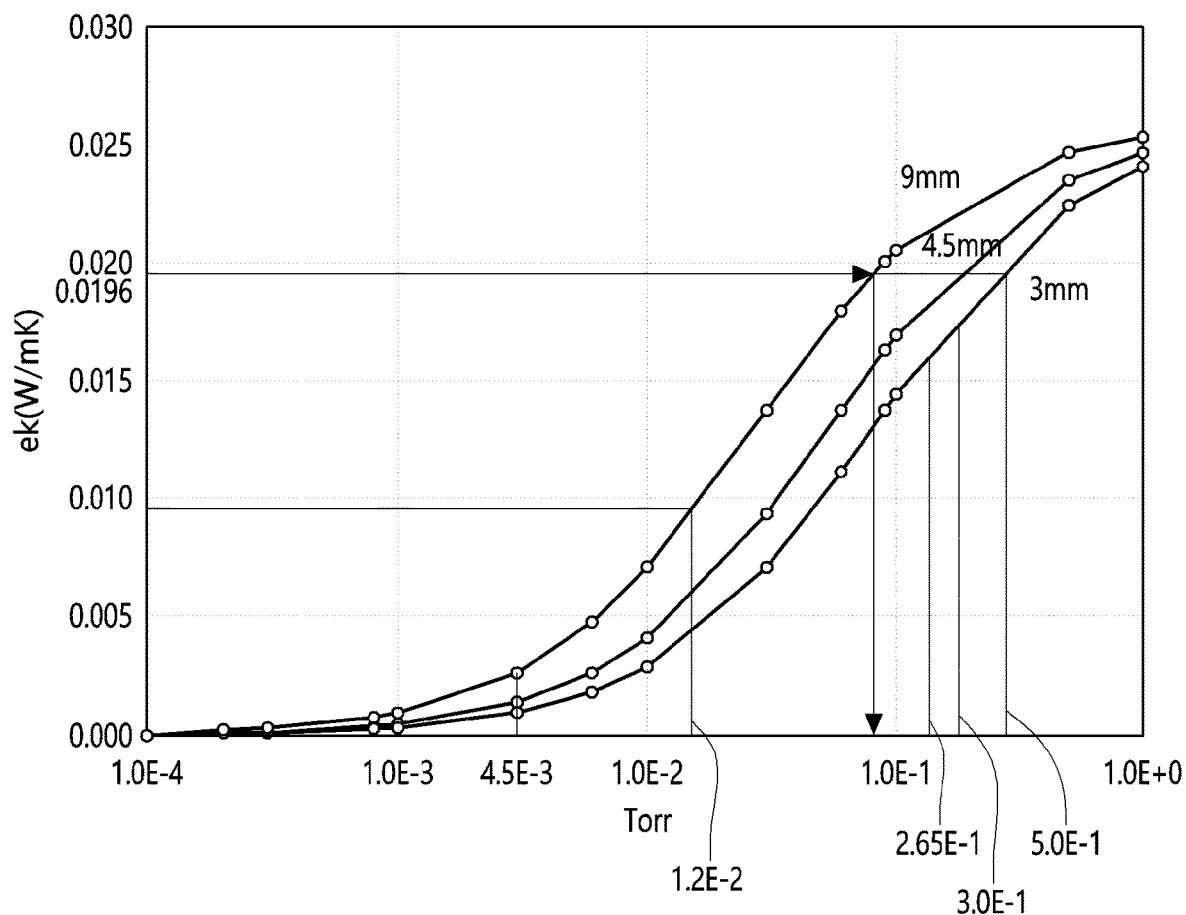

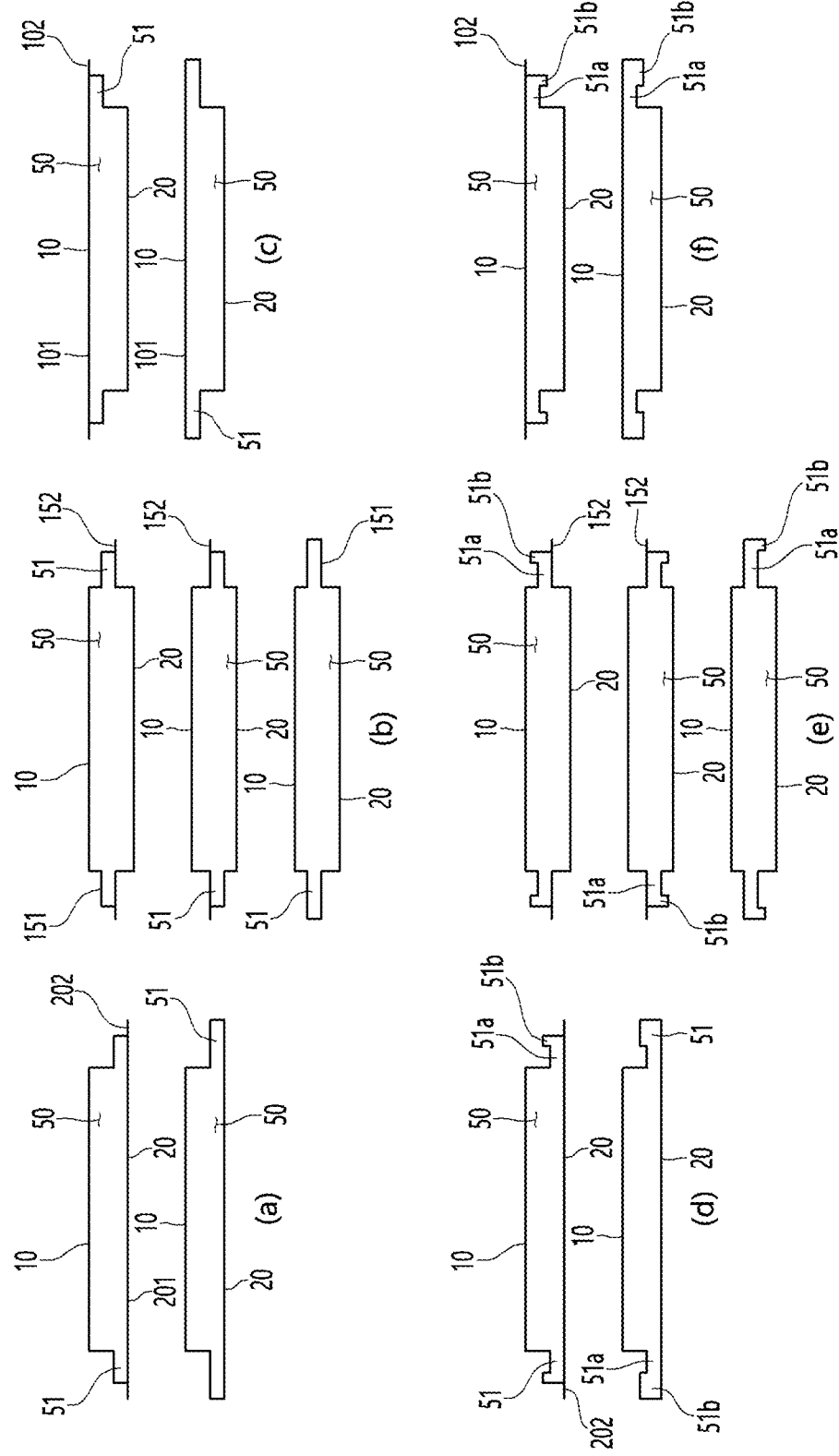

[Fig. 8]
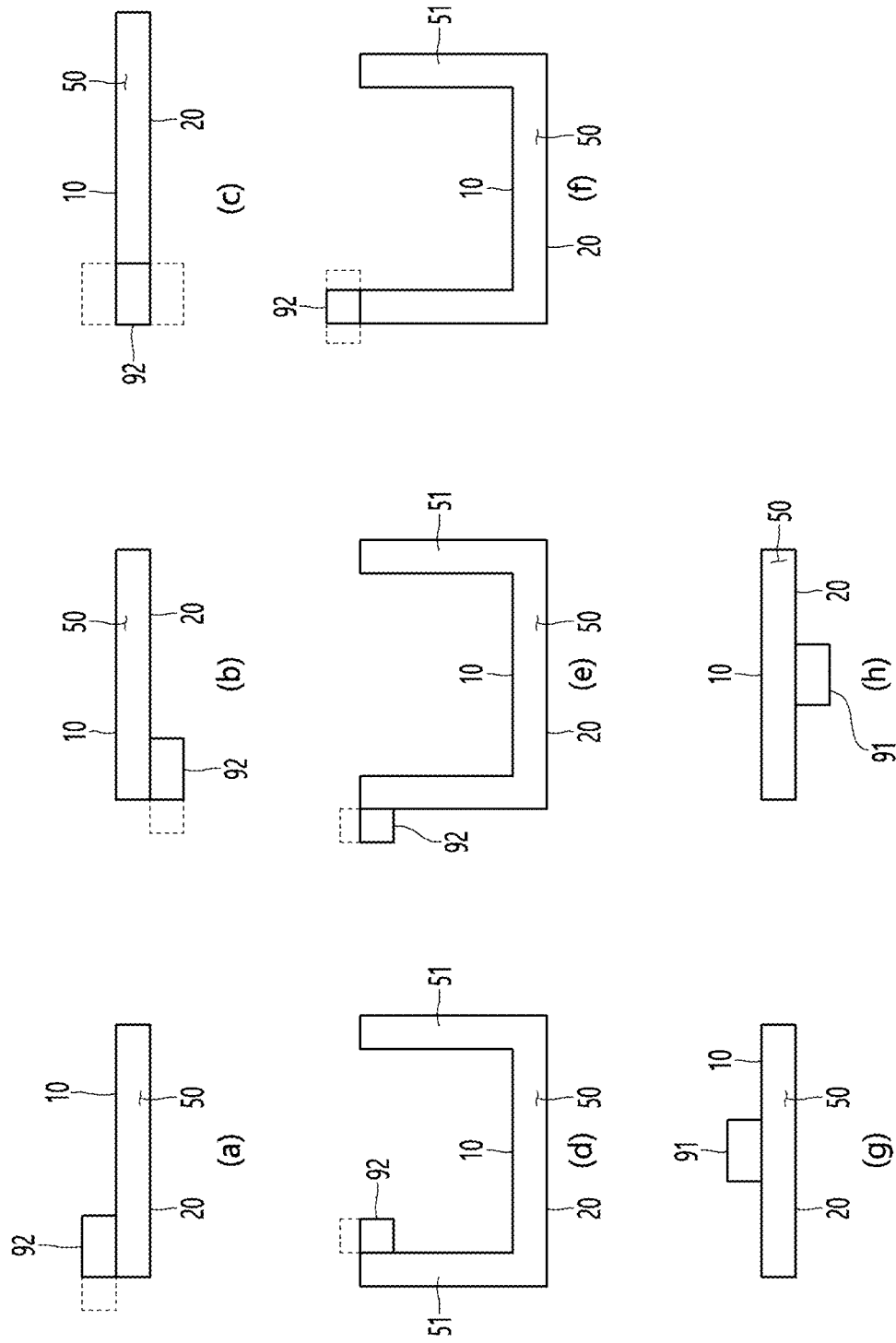

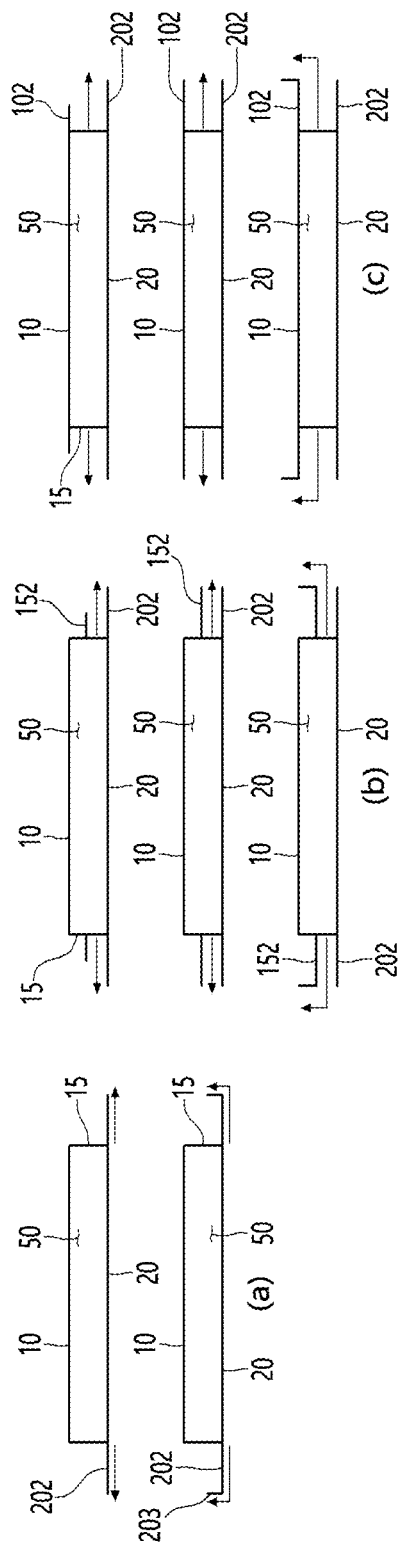
[Fig. 9]

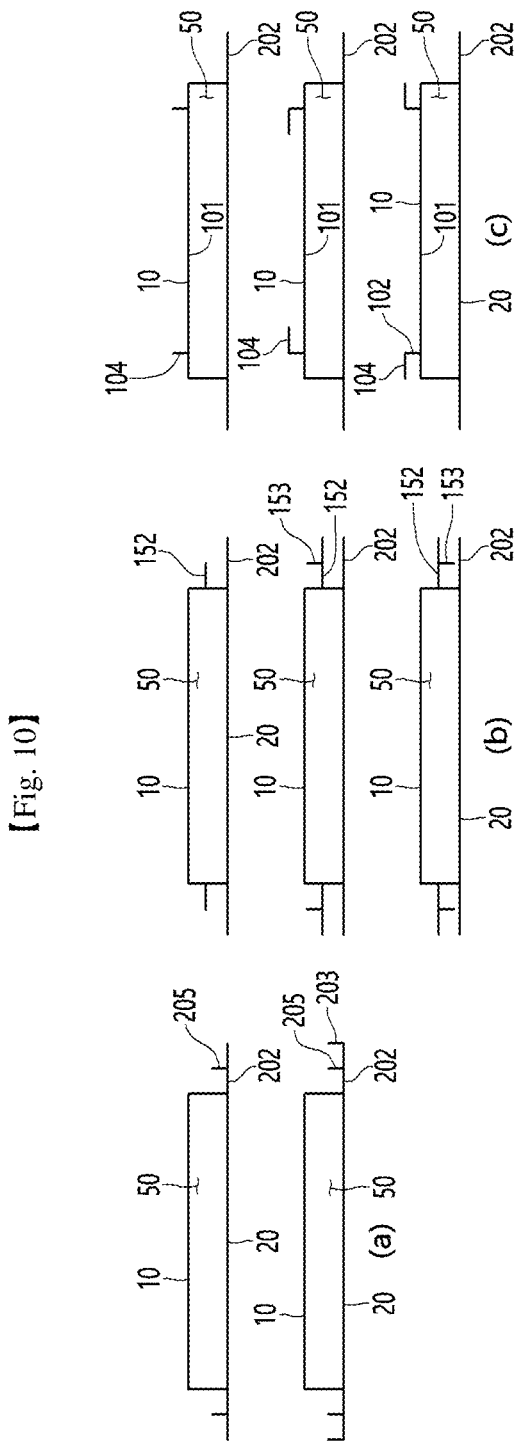
[Fig. 10]

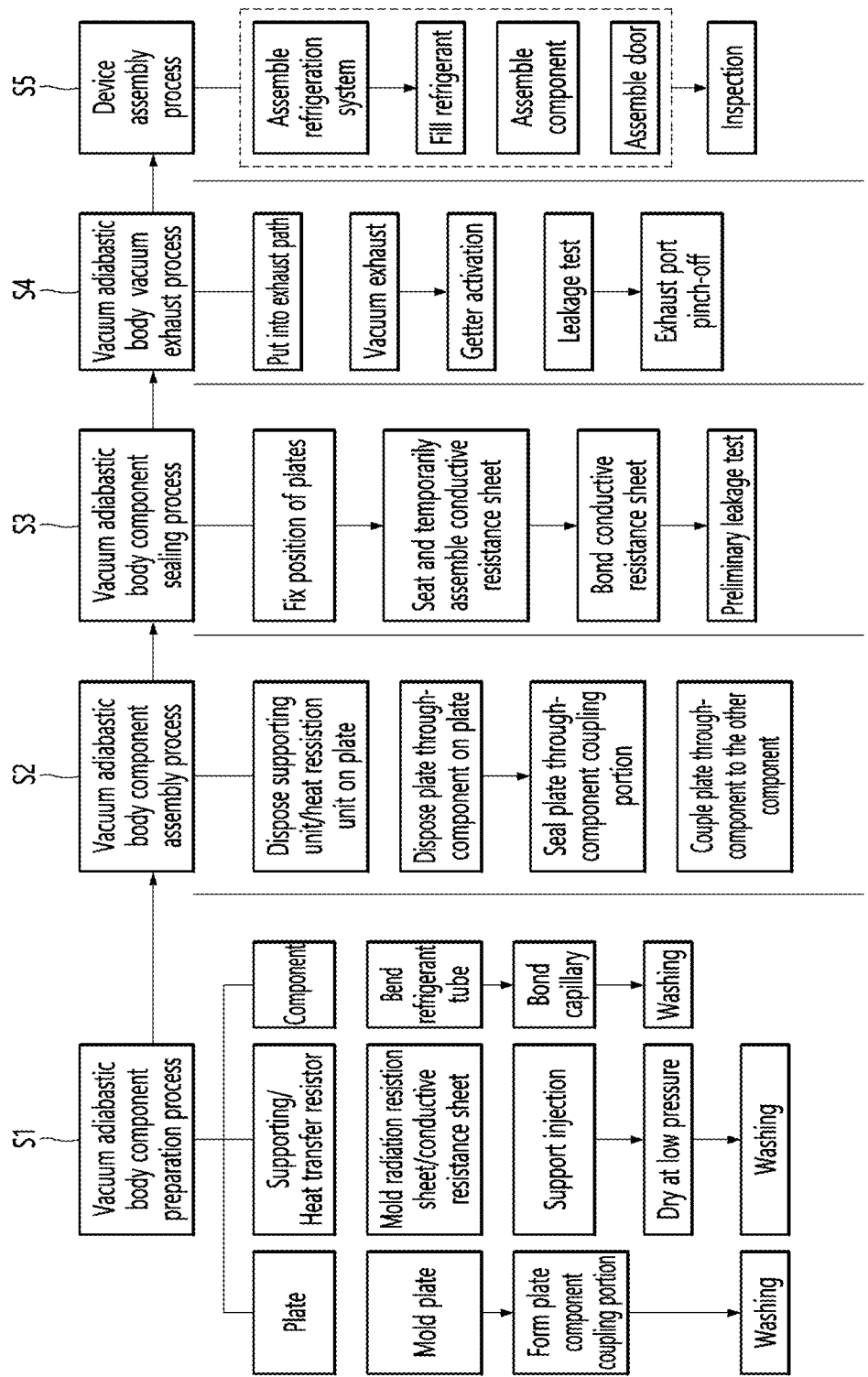
[Fig. 11]

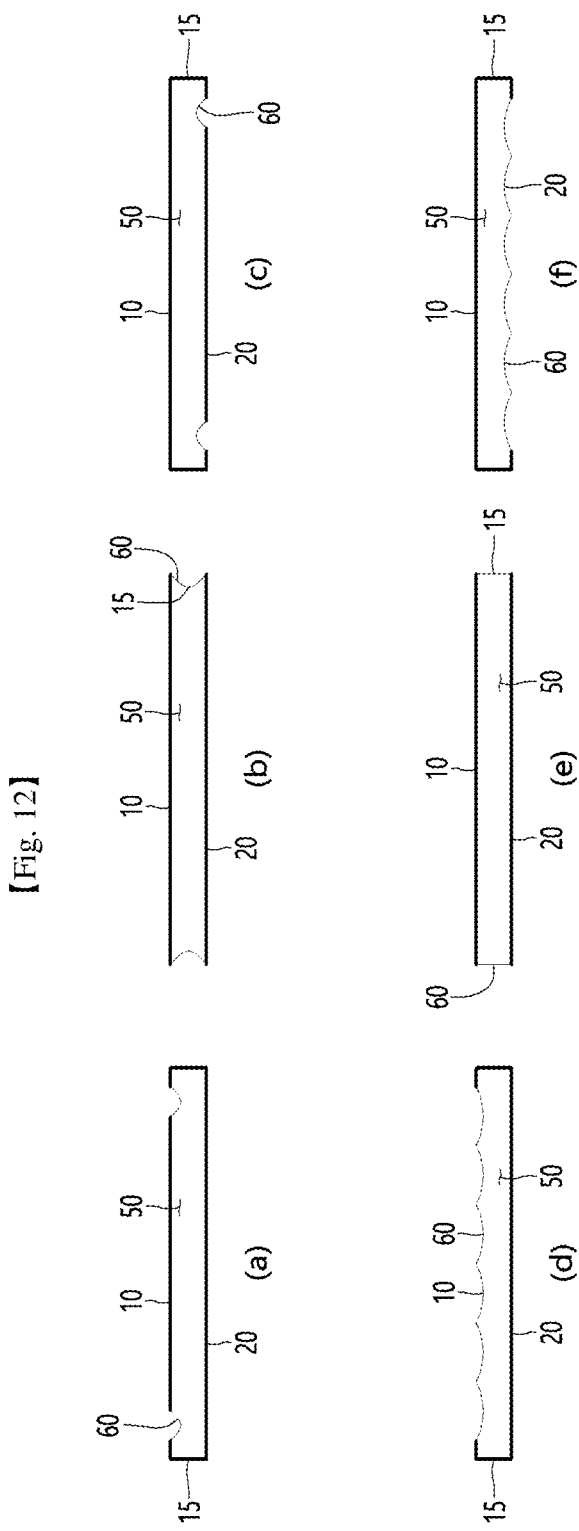
[Fig. 12]

[Fig. 13]
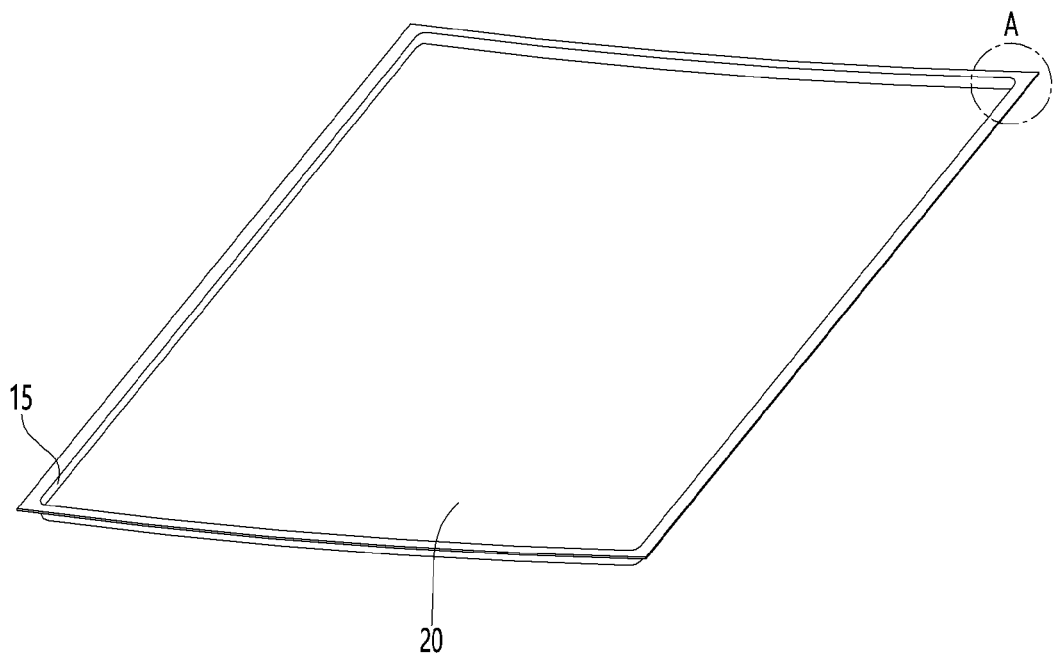
[Fig. 14]
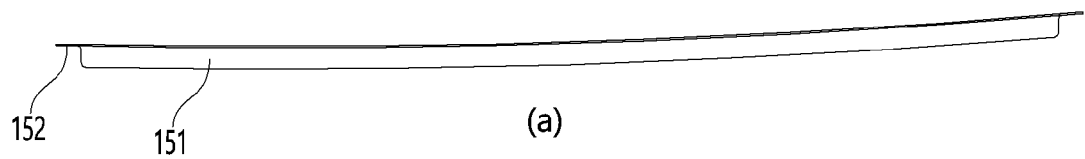
(a)
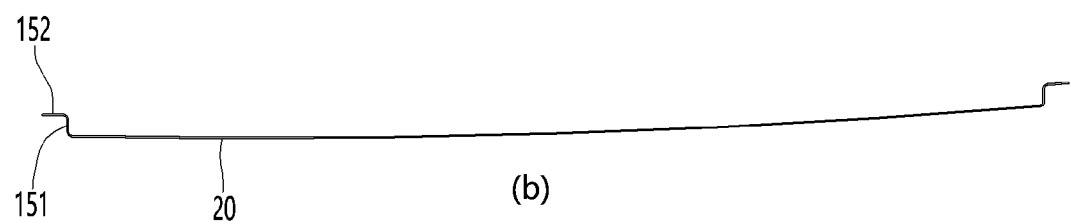
(b)
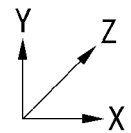

[Fig. 15]
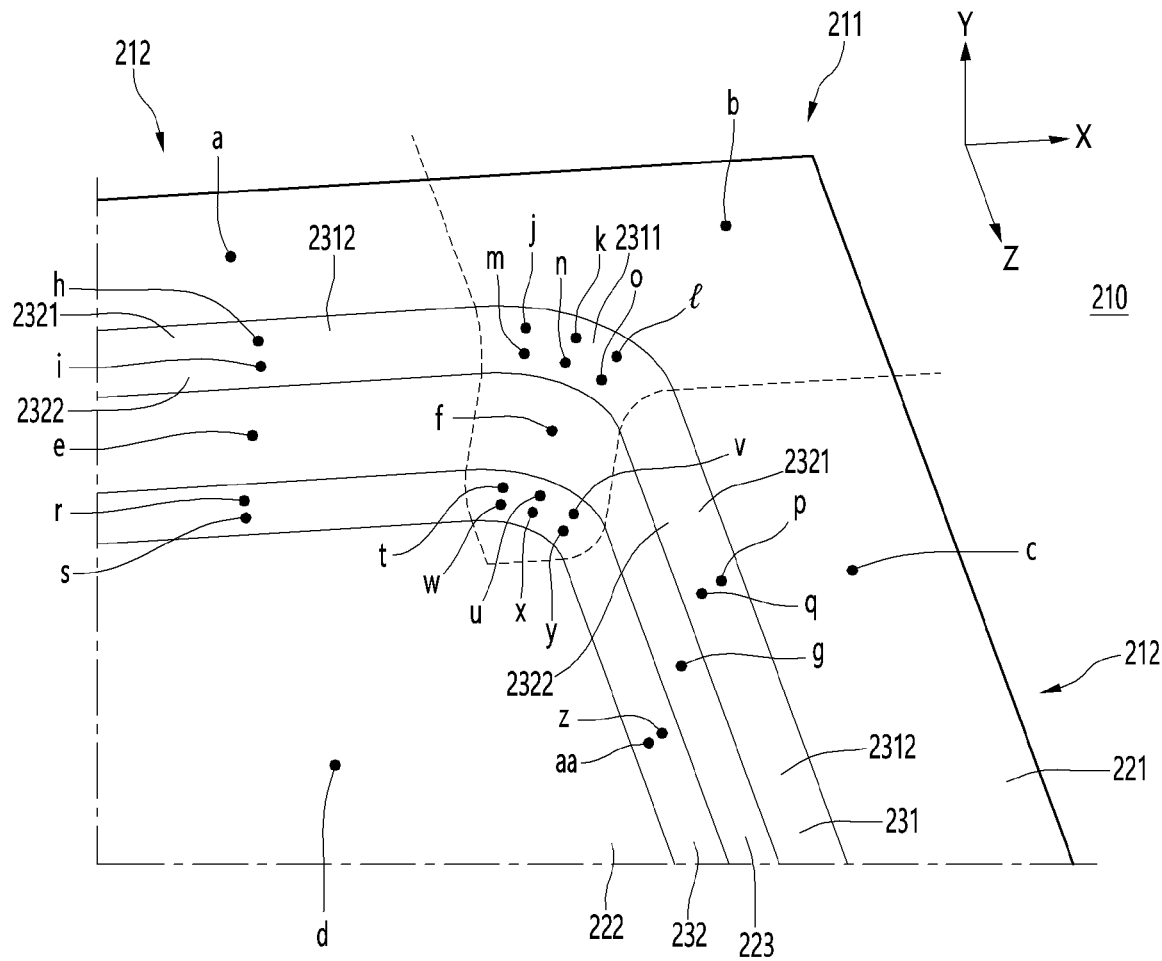
[Fig. 16]
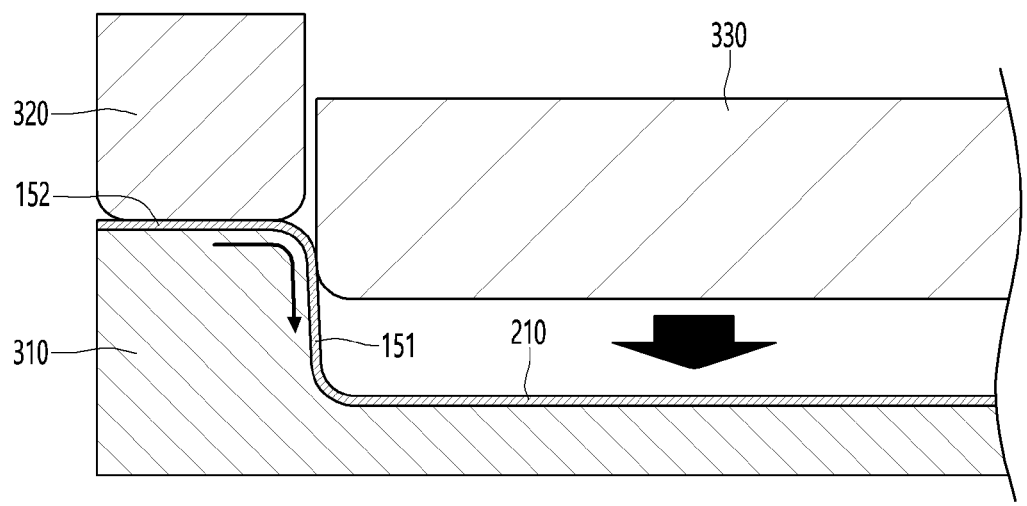

[Fig. 17]
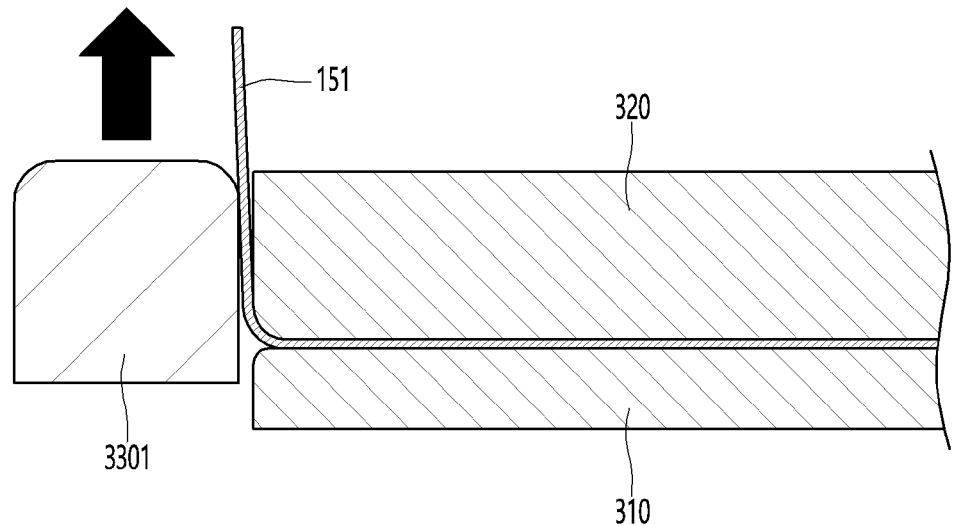
[Fig. 18]
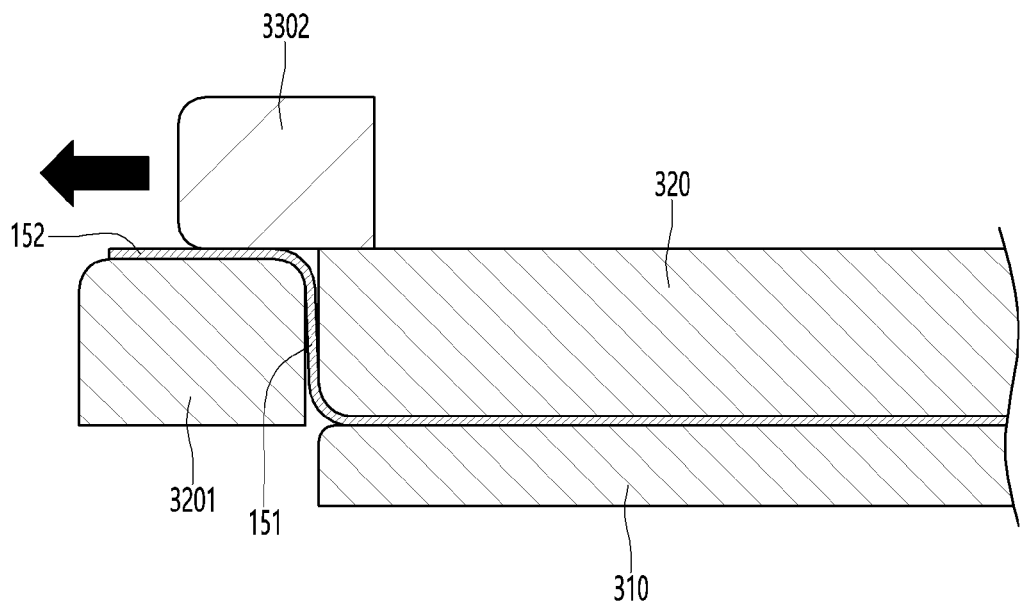

[Fig. 19]
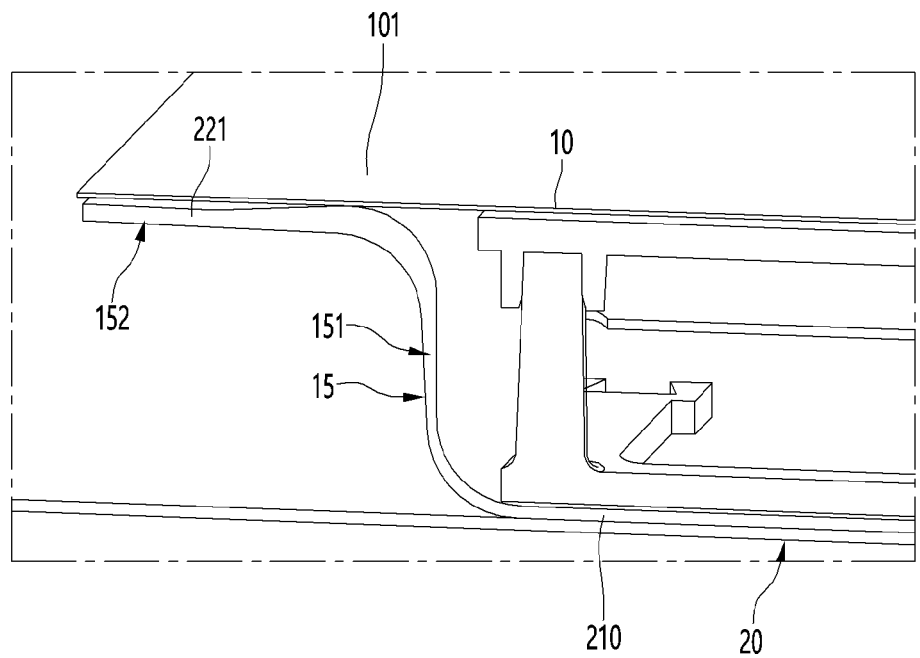
[Fig. 20]
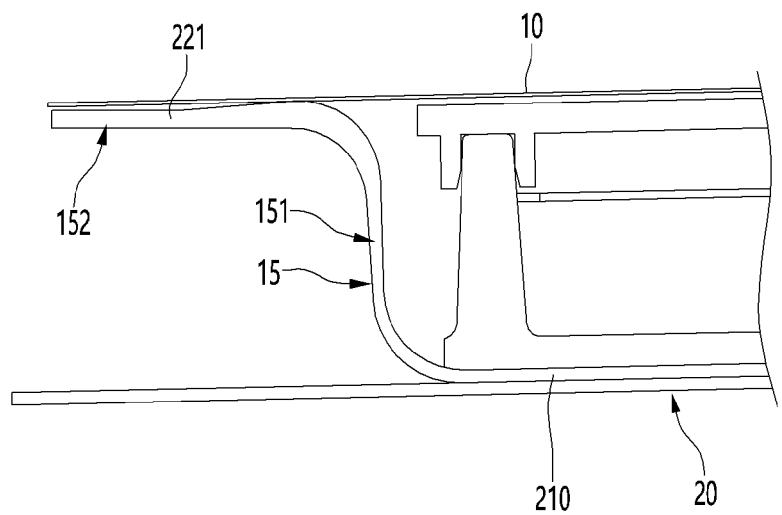

[Fig. 21]
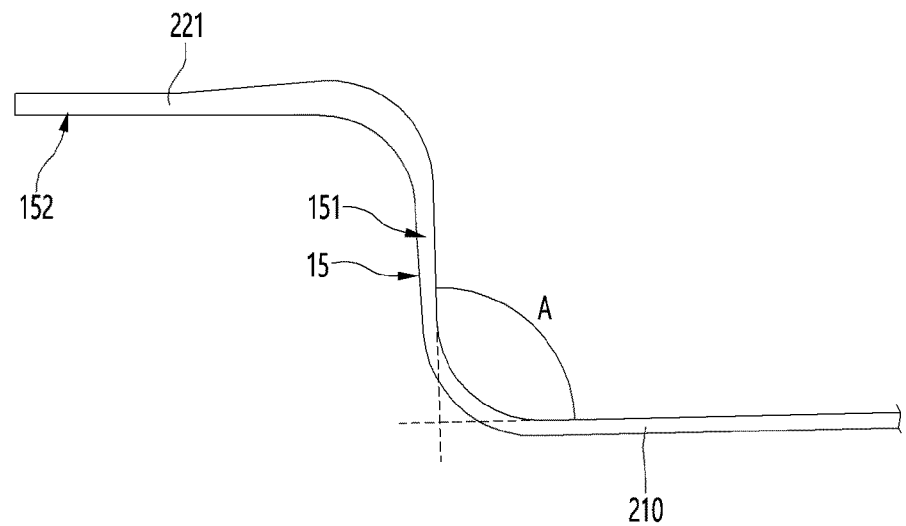
[Fig. 22]
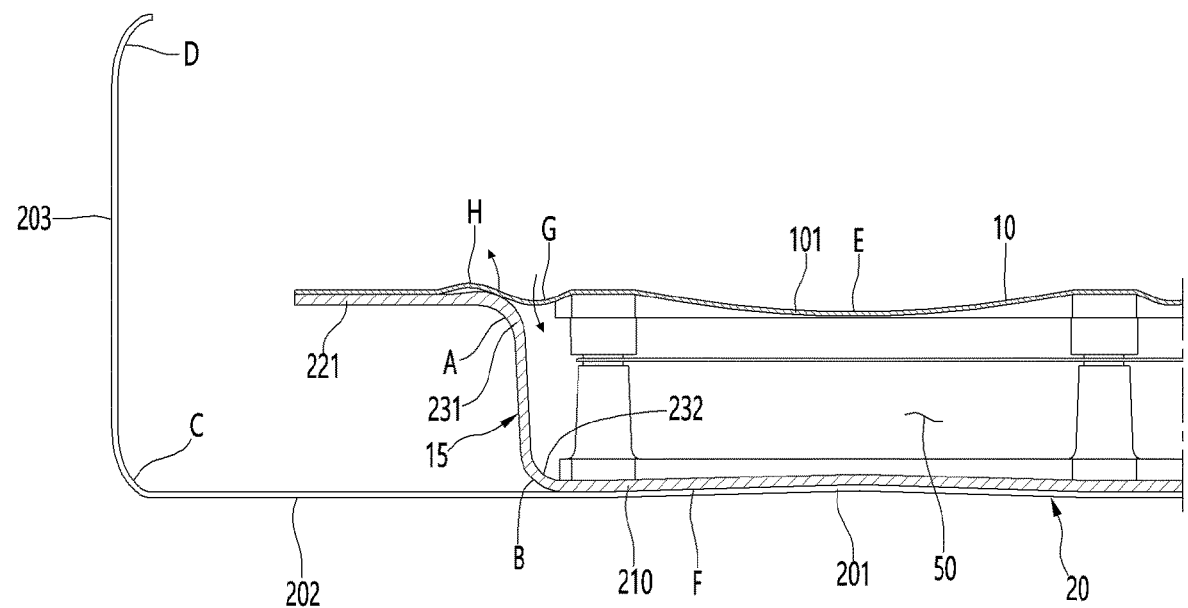

VACUUM ADIABATIC BODY AND FABRICATION METHOD FOR THE SAME

CROSS-REFERENCE TO RELATED PATENT APPLICATIONS

This application is a U.S. National Stage Application under 35 U.S.C. § 371 of PCT Application No. PCT/KR2021/015549, filed Nov. 1, 2021, which claims priority to Korean Patent Application Nos. 10-2020-0144737, 10-2020-0144741 and 10-2020-0144764, all three filed Nov. 2, 2020, whose entire disclosures are hereby incorporated by reference.

TECHNICAL FIELD

The present disclosure relates to a vacuum adiabatic body and a method for fabricating the same.

BACKGROUND ART

It is possible to improve heat insulation performance by forming a vacuum in an insulating wall. A device having an internal space in which a vacuum is at least partially formed to achieve a thermal insulation effect is called a vacuum adiabatic body.

The applicant develops a technology to obtain a vacuum adiabatic body to be used in various devices and home appliances and discloses a vacuum adiabatic body in Korean Patent Application Nos. 10-2015-0109724 and 10-2015-0109722.

In the cited references, a plurality of members is coupled to provide a vacuum space. In detail, a first plate, a conductive resistance sheet, a side plate, and a second plate are sealed to each other. In order to seal a coupler of the member, a sealing process is performed. Slight process errors in the sealing process lead to vacuum breakage.

The cited references do not disclose a detailed method of insulating a periphery of a vacuum adiabatic body. In particular, a method of a fabricating a vacuum adiabatic body is not described.

DISCLOSURE OF INVENTION

Technical Problem

Therefore, the present disclosure has been made in view of the above problems, and it is an object of the present disclosure to provide a vacuum adiabatic body for overcoming a problem of poor sealing by reducing sealing points on a wall that provides a vacuum space.

The present disclosure provides a vacuum adiabatic body with high productivity.

The present disclosure provides a vacuum adiabatic body for reducing heat conduction along an external wall of the vacuum adiabatic body and improving insulation performance.

The present disclosure provides a vacuum adiabatic body for preventing leakage of a vacuum space by completely adhering members during laser welding for forming vacuum pressure.

The present disclosure provides a vacuum adiabatic body for reducing manufacturing costs for manufacturing the vacuum adiabatic body.

The present disclosure provides a vacuum adiabatic body for maintaining vacuum pressure for a long time rather than being damaged even if vacuum pressure is applied.

Solution to Problem

A vacuum adiabatic body according to the present disclosure may include a first plate, a second plate, and a seal for sealing the first plate and the second plate to provide a vacuum space. Optionally, the vacuum adiabatic body may include a support for maintaining the vacuum space. Optionally, the vacuum adiabatic body may include a heat transfer resistor for reducing heat transfer between the first plate and the second plate. Optionally, the vacuum adiabatic body may include a component coupler that is connected to at least one of the first and second plates and to which a component is coupled. Thus, a vacuum adiabatic body for achieving an industrial purpose may be provided.

Optionally, the first plate, the second plate, and the side plate may provide a plurality of straight portions. Optionally, in at least one of the plurality of straight portions, a portion close to a center of the vacuum adiabatic body may be thinner than a portion close to an edge of the vacuum adiabatic body. Accordingly, sealing failure may be prevented. Thus, heat conduction may be reduced. Accordingly, the vacuum adiabatic body may be conveniently molded.

Optionally, the vacuum adiabatic body may be fabricated by a vacuum adiabatic body component preparation process in which a component for forming the vacuum adiabatic body is prepared in advance. Optionally, the vacuum adiabatic body may be fabricated by a vacuum adiabatic body component assembly process in which the prepared component is assembled. Optionally, the vacuum adiabatic body may be fabricated by a vacuum adiabatic body vacuum exhaust process in which a gas in the vacuum space is discharged after the component assembly process. Optionally, after the vacuum adiabatic body component preparation process is performed, at least one of the plurality of straight portions may have a thickness reduced toward the first curved portion from an edge of the vacuum adiabatic body.

Optionally, the second plate and the side plate may be provided as one body by a single body. Thus, the productivity of the vacuum adiabatic body is improved. Optionally, a plurality of members may be provided as a single body. Thus, manufacturing costs may be reduced.

Optionally, the vacuum adiabatic body may provide a first straight portion and a second straight portion below the first straight portion in a height direction (a Y axis) of the vacuum space. Optionally, the vacuum adiabatic body may provide a third straight portion between the first and second straight portions. Optionally, the vacuum adiabatic body may provide a first curved portion between the first and third straight portions. Optionally, the vacuum adiabatic body may provide a second curved portion between the third and second straight portions. Optionally, the third straight portion may include at least a rotated and translated portion. According to the configuration, a shape thereof may be sufficiently maintained with respect to translation of vacuum pressure.

Optionally, the second straight portion may include at least a rotated and translated portion. According to the configuration, a shape thereof may be sufficiently maintained with respect to translation of vacuum pressure.

Optionally, the thickness of the single body may be changed after and before the vacuum adiabatic body component preparation process is performed. Optionally, after the vacuum adiabatic body component preparation process is performed, at least one of the plurality of straight portions may be changed in a longitudinal direction. For example, after the vacuum adiabatic body component preparation process is performed, the thickness of at least one of the plurality of straight portions may be reduced in a longitudinal direction. According to the present disclosure, the vacuum adiabatic body may be easily manufactured.

Optionally, before and the after the vacuum adiabatic body component preparation process is performed, the thickness of the single body may be changed. Accordingly, the single body may be conveniently manufactured.

Optionally, bending stress may be concentrated on the curved portion. A concentrated bending stress may be stress that transmits force transmitted from any one of the two straight lines in the other direction. In one or more embodiments, A first curved portion may include at least one of a first-1 curved portion adjacent to the first straight portion or a first-2 curved portion adjacent to the third straight portion. A point h may have a curvature radius less than that of the point i. The point h may be provided to be thicker than the point i. A third straight portion may be an area to which a small load extending in the height direction of the vacuum space is applied. The thickness of the first straight portion and/or the thickness of the second straight portion may be a mean thickness of each straight portion. The point at which the number of times of external impact to be applied and/or the point at which the stress is dispersed may be thinned, and other portions may be reinforced. A movement of the base material may include a stretching action. An external impact and/or A concentrated stress may be applied to the vacuum adiabatic body.

Optionally, the single body 210 may have a predetermined thickness. The single body 210 may not be deformed by vacuum pressure of the vacuum space 50.

Optionally, at least one of the first, second, and side plates 10, 20, and 15 may have a predetermined curvature for providing a vacuum adiabatic body.

Optionally, the portion "H" may be a curvature due to at least one a thickness difference of the single body 210 and curvature spread of the portion "G".

Optionally, the third straight portion 223 may include a first portion of the third straight portion 223, which has a large thickness. The first portion of the third straight portion 223 may be placed close to the first curved portion 231. The third straight portion 223 may include a second portion of the third straight portion 223, which has a small thickness. The second portion of the third straight portion 223 may be placed close to the second curved portion 232.

Optionally, the thin portion of the second straight portion 222 may act as the center of rotation and deformation of at least one of the second curved portion 232, the third straight portion 223, the first curved portion 231, or the first straight portion 221.

Optionally, by at least one of the supporting and reinforcing actions of the side plate 15 and the support 30, the strength of the vacuum adiabatic body may be increased.

Advantageous Effects of Invention

According to the present disclosure, a second plate and a side plate may be provided as a single plate member. Thus, sealing points for coupling the plates may be reduced, and a risk of vacuum breakage may be largely overcome.

According to the present disclosure, wasting of parts, re-welding, and lowering of product yield may be prevented.

According to the present disclosure, the productivity of the vacuum adiabatic body may be improved by reducing a sealing area, standardizing components, integrating the components, and exhausting a plurality of vacuum adiabatic bodies.

According to the present disclosure, two members are used as a single member and are provided together through a single processing process, thereby reducing manufacturing costs, and improving productivity.

According to the present disclosure, there is no risk of leakage, and a cross section of a single body is provided in a number of curves and straight lines, and accordingly, it may be possible to resist deformation due to vacuum pressure.

According to the present disclosure, at least a portion of a first plate may be a conductive resistance sheet. Accordingly, by sufficiently resisting cold conduction, insulation performance may be improved.

BRIEF DESCRIPTION OF DRAWINGS

FIG. 1 is a perspective view of a refrigerator according to an embodiment.

FIG. 2 is a schematic view illustrating a vacuum adiabatic body used for a body and a door of the refrigerator.

FIG. 3 is a view illustrating an example of a support that maintains the vacuum space.

FIG. 4 is a view for explaining an example of a vacuum adiabatic body based on a heat transfer resistor.

FIG. 5 is a graph for observing a process of exhausting the inside of the vacuum adiabatic body with a time and pressure when the support is used.

FIG. 6 is a graph illustrating results obtained by comparing the vacuum pressure with gas conductivity.

FIG. 7 is a view illustrating various examples of the vacuum space.

FIG. 8 is a view for explaining another adiabatic body.

FIG. 9 is a view for explaining a heat transfer path between first and second plates having different temperatures.

FIG. 10 is a view for explaining a branch portion on the heat transfer path between first and second plates having different temperatures.

FIG. 11 is a view for explaining a process of manufacturing the vacuum adiabatic body.

FIG. 12 is a diagram for explaining a conductive resistance sheet placed on a heat transfer path.

FIG. 13 is a perspective view of a second plate.

FIG. 14 is a set of a front view and a cross-sectional view of a second plate.

FIG. 15 is an enlarged view of a corner section of a second plate.

FIG. 16 is a diagram showing an embodiment in which a second plate is manufactured.

FIGS. 17 and 18 are diagrams showing another embodiment in which the single body is manufactured.

FIG. 19 is a partial cross-sectional perspective view of a vacuum adiabatic body.

FIG. 20 is a partial front view of the cross-sectional view of FIG. 19.

FIG. 21 is a partial cross-sectional view of a second plate.

FIG. 22 is a reference diagram for explaining a curvature of each member of a vacuum adiabatic body.

BEST MODE FOR CARRYING OUT THE INVENTION

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space.

The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta 1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time $t1a$ may be greater than or equal to about 0.5 hr and less than or equal to about 1 hr. The time $t1b$ may be greater than or equal to about 24.0 hr and less than or equal to about 65 hr. The time $\Delta t1$ may be about 1.0 hr or more and about 48.0 hr or less. The time $\Delta t1$ may be about 2 hr or more and about 24.0 hr or less. The time $\Delta t1$ may be about 3 hr or more and about 12.0 hr or less. In this case, it may be the vacuum adiabatic body that needs to maintain the $\Delta t1$ as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time $\Delta t1$ may be a time $t1a$ or more and a time $t1b$ or less. The time $t2a$ may be greater than or equal to about 0.1 hr and less than or equal to about 0.3 hr. The time $t2b$ may be greater than or equal to about 1 hr and less than or equal to about 5.0 hr. The time $\Delta t2$ may be about 0.2 hr or more and about 3.0 hr or less. The time $\Delta t2$ may be about 0.3 hr or more and about 2.0 hr or less. The time Δt2 may be about 0.5 hr or more and about 1.5 hr or less. In this case, even if the time Δt2 is kept as short as possible, the sufficient outgassing through the getter may be applied to the vacuum adiabatic body. In the vacuum adiabatic body vacuum exhaust process, the time Δt3 may be a time t3a or more and a time t3b or less. The time t2a may be greater than or equal to about 0.2 hr and less than or equal to about 0.8 hr. The time t2b may be greater than or equal to about 1 hr and less than or equal to about 65.0 hr. The tine Δt3 may be about 0.2 hr or more and about 48.0 hr or less. The time Δt3 may be about 0.3 hr or more and about 24.0 hr or less. The time Δt3 may be about 0.4 hr or more and about 12.0 hr or less. The time Δt3 may be about 0.5 hr or more and about 5.0 hr or less. After the heating or drying process is performed during the exhaust process, the cooling process may be performed. For example, when the heating or drying process is performed for a long time, the time Δt3 may be long. The vacuum adiabatic body according to the present disclosure may be manufactured so that the time Δt1 is greater than the time Δt2, the time Δt1 is less than or equal to the time Δt3, or the time Δt3 is greater than the time Δt2. The following relational expression is satisfied: Δt2<Δt1≤Δt3. The vacuum adiabatic body according to an embodiment may be manufactured so that the relational expression: Δt1+Δt2+Δt3 may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: Δt1+Δt2+Δt3 may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time.

FIG. 5a is a graph of an elapsing time and pressure in the exhaust process according to an example, and FIG. 5b is a view explaining results of a vacuum maintenance test in the acceleration experiment of the vacuum adiabatic body of the refrigerator having an internal volume of about 128 liters. Referring to FIG. 5b, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about $1.0 \times 10^{-1}$ Torr or be greater than about 4.5E-3 Torr and less than about 5E-1 Torr. Here, the A may be greater than or equal to about $1.0 \times 10^{-6}$ Torr and less than or equal to about 1.0E-5 Torr. The A may be greater than or equal to about $1.0 \times 10^{-5}$ Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8a to 8f, another adiabatic body may include a peripheral adiabatic body. The peripheral adiabatic body may be disposed on at least a portion of a periphery of the vacuum adiabatic body, a periphery of the first plate, a periphery of the second plate, and the side plate.

The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8g to 8h, another adiabatic body may include a central adiabatic body. The central adiabatic body may be disposed on at least a portion of a central portion of the vacuum adiabatic body, a central portion of the first plate, or a central portion of the second plate.

Referring to FIG. 8a, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8b, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8c, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8d, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8e and 8f, in the peripheral adiabatic body, the vacuum space extension portion may be disposed on a periphery of the second plate or the side plate. The same explanation as in FIG. 8d may be applied. Referring to FIG. 8g, the central adiabatic body 91 may be placed on a central portion of the first plate. The central adiabatic body may improve adiabatic performance of the central portion of the first plate. Referring to FIG. 8h, the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9a, the second plate may include the extension portion extending to the periphery of the second plate. Here, the extension portion may further include a portion extending backward. Referring to FIG. 9b, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9c, the first plate may include the extension portion extending to the periphery of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10a, the second plate may include the branched portion 205. The branched portion may be provided in plurality, which are spaced apart from each other. The branched portion may include a third portion 203 of the second plate. Referring to FIG. 10b, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10c, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10a, 10b, and 10c may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a plate is as follows. Any one or two or more examples among following examples of the present disclosure will be described. The vacuum adiabatic body component preparation process may include a process of manufacturing the plate. Before the vacuum adiabatic body vacuum exhaust process is performed, the process of manufacturing the plate may be performed. Optionally, the plate may be manufactured by a metal sheet. For example, a thin and wide plate may be manufactured using plastic deformation. Optionally, the manufacturing process may include a process of molding the plate. The molding process may be applied to the molding of the side plate or may be applied to a process of integrally manufacturing at least a portion of at least one of the first plate and the second plate, and the side plate. For example, the molding may include drawing. The molding process may include a process in which the plate is partially seated on a support. The molding process may include a process of partially applying force to the plate. The molding process may include a process of seating a portion of the plate on the support a process of applying force to the other portion of the plate. The molding process may include a process of deforming the plate. The deforming process may include a process of forming at least one or more curved portions on the plate. The deforming process may include a process of changing a curvature radius of the plate or a process of changing a thickness of the plate. As a first example, the process of changing the thickness may include a process of allowing a portion of the plate to increase in thickness, and the portion may include a portion extending in a longitudinal direction of the internal space (a first straight portion). The portion may be provided in the vicinity of the portion at which the plate is seated on the support in the process of molding the plate. As a second example, the process of changing the thickness may include a process of reducing a thickness of a portion of the plate, and the portion may include a portion extending in a longitudinal direction of the internal space (a second straight portion). The portion may be provided in the vicinity of a portion to which force is applied to the plate in the process of molding the plate. As a third example, the process of changing the thickness may include a process of reducing a thickness of a portion of the plate, and the portion may include a portion extending in a height direction of the internal space (the second straight portion). The portion may be connected to the portion extending in the longitudinal direction of the internal space of the plate. As a fourth example, the process of changing the thickness may include a process of allowing a portion of the plate to increase in thickness, and the portion may include at least one of a portion to which the side plate extends in the longitudinal direction of the internal space and a curved portion provided between the portions extending in the height direction of the internal space (a first curved portion). The curved portion may be provided at the portion seated on the support of the plate or in the vicinity of the portion in the process of molding the plate. As a fifth example, the process of changing the thickness may include a process of allowing a portion of the plate to decrease in thickness, and the portion may include at least one of a portion to which the side plate extends in the longitudinal direction of the internal space and a curved portion provided between the portions extending in the height direction of the internal space (a second curved portion). The curved portion may be provided in the vicinity of a portion to which force is applied to the plate in the process of molding the plate. The deforming process may be any one of the above-described examples or an example in which at least two of the above-described examples are combined.

The process associated with the plate may selectively include a process of washing the plate. An example of a process sequence associated with the process of washing the plate is as follows. The present disclosure may be any one of the following examples or a combination of two or more examples. Before the vacuum adiabatic body vacuum exhaust process is performed, the process of washing the plate may be performed. After the process of manufacturing the plate is performed, at least one of the process of molding the plate and the process of washing the plate may be performed. After the process of molding the plate is performed, the process of washing the plate may be performed. Before the process of molding the plate is performed, the process of washing the plate may be performed. After the process of manufacturing the plate is performed, at least one of a process of providing a component coupling portion to a portion of the plate or the process of washing the plate may be performed. After the process of providing the component coupling portion to a portion of the plate is performed, the process of washing the plate may be performed.

The process associated with the plate selectively include the process of providing the component coupling portion to the plate. An example of a process sequence associated with the process of providing the component coupling portion to the plate is as follows. The present disclosure may be any one of the following examples or a combination of two or more examples. Before the vacuum adiabatic body vacuum exhaust process is performed, a process of providing the component coupling portion to a portion of the plate may be performed. For example, the process of providing the component coupling portion may include a process of manufacturing a tube provided to the component coupling portion. The tube may be connected to a portion of the plate. The tube may be disposed in an empty space provided in the plate or in an empty space provided between the plates. As another example, the process of providing the component coupling portion may include a process of providing a through-hole in a portion of the plate. For another example, the process of providing the component coupling portion may include a process of providing a curved portion to at least one of the plate or the tube.

The process associated with the plate may optionally include a process for sealing the vacuum adiabatic body component associated with the plate. An example of a process sequence associated with the process of sealing the vacuum adiabatic body component associated with the plate is as follows. The present disclosure may be any one of the following examples or a combination of two or more examples. After the process of providing the through-hole in the portion of the plate is performed, at least one of a process of providing a curved portion to at least a portion of the plate or the tube or a process of providing a seal between the plate and the tube may be performed. After the process of providing the curved portion to at least a portion of at least one of the plate or the tube is performed, the process of sealing the gap between the plate and the tube may be performed. The process of providing the through-hole in the portion of the plate and the process of providing the curved portion in at least a portion of the plate and the tube may be performed at the same time. The process of providing a through-hole in a part of the plate and the process of providing the seal between the plate and the tube may be performed at the same time. After the process of providing the curved portion to the tube is performed, the process of providing a through-hole in the portion of the plate may be performed. Before the vacuum adiabatic body vacuum exhaust process is performed, a portion of the tube may be provided and/or sealed to the plate, and after the vacuum adiabatic body vacuum exhaust process is performed, the other portion of the tube may be sealed.

When at least a portion of the plate is used to be integrated with a heat transfer resistor, the example of the process associated with the plate may also be applied to the example of the process of the heat transfer resistor.

Optionally, the vacuum adiabatic body may include a side plate connecting the first plate to the second plate. Examples of the side plate are as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates.

In a similar example to this, optionally, the vacuum adiabatic body may include a heat transfer resistor provided to reduce a heat transfer amount between a first space provided in the vicinity of the first plate and a second space provided in the vicinity of the second plate. Examples of the heat transfer resistor are as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

The contents described in FIGS. 1 to 11 may be applied to all or selectively applied to the embodiments described with reference to the drawings below.

As an embodiment, an example of a process associated with a heat transfer resistor is as follows. The present disclosure may be any one of the following examples or a combination of two or more examples. The vacuum adiabatic body component preparation process may include a process of manufacturing the heat transfer resistor. Before the vacuum adiabatic body vacuum exhaust process is performed, the process of manufacturing the heat transfer resistor may be performed. The heat transfer resistor may be manufactured by a metal sheet. Optionally, before the vacuum adiabatic body vacuum exhaust process is performed, the process of washing the heat transfer resistor may be performed. Optionally, before the vacuum adiabatic body vacuum exhaust process is performed, a process of providing the component coupling portion to a portion of the heat transfer resistor may be performed. Optionally, the process of providing the component coupling portion may include a process of manufacturing a tube provided to the component coupling portion. The tube may be connected to a portion of the heat transfer resistor. The tube may be disposed in an empty space provided in the heat transfer resistor or in an empty space provided between the heat transfer resistors. Optionally, the process of providing the component coupling portion may include a process of providing a through-hole in a portion of the heat transfer resistor. Optionally, the process of providing the component coupling portion may include a process of providing a curved portion to at least one of the heat transfer resistor or the tube.

Optionally, during the vacuum adiabatic body vacuum exhaust process is performed, the process of deforming the heat transfer resistor may be performed. An example of the process of deforming the heat transfer resistor may be applied to the process of deforming the plate. An example of the process of deforming the heat transfer resistor may be applied when at least a portion of the plate and the heat transfer resistor are integrated with each other. Examples of the process of deforming the heat transfer resistor are as follows. The present disclosure may be any one of the following examples or a combination of two or more examples. First, the process may include a process in which the heat transfer resistor is recessed in a direction toward the internal space or toward the outside of the internal space. Therefore, a heat transfer path may extend to reduce a degree of heat conduction through the heat transfer resistor. Second, the process may include a process of changing a curvature radius of the heat transfer resistor. For example, the process of changing the curvature radius may include changing the curvature radius in at least a portion of a central portion and a peripheral portion of the heat transfer resistor. As another example, the process of changing the curvature radius may include a process of changing the curvature radius in the vicinity of an empty space provided inside the support, or a process of changing the curvature radius in the vicinity of an empty space provided to the outside of an edge of the support. As another example, the process of deforming the curvature radius may include a process of providing the heat transfer resistor to a portion, which is not in contact with the support. As another example, the process of changing the curvature radius may include a process of changing a curvature radius at at least a portion of the first portion or the second portion of the heat transfer resistor. Here, the first portion of the heat transfer resistor may be a portion defining a vacuum space. The second portion of the heat transfer resistor may be a portion extending in a direction away from the first portion to the vacuum space. Third, the process may include a process of changing a thickness of the heat transfer resistor. For example, the process of changing the thickness may include a process of changing a thickness at the portion supported by the support. As another example, the process of changing the thickness may include a process of changing a thickness in the vicinity of the empty space provided inside the support. As another example, the process of changing the thickness may include a process of changing a thickness in the vicinity of the empty space provided outside the edge of the support. As another example, the process of changing the thickness may include a process of providing the heat transfer resistor to a portion that is not in contact with the support. After the process of changing the curvature radius or the thickness in the central portion of the heat transfer resistor is performed, the process of changing the curvature radius or the thickness in the peripheral portion of the heat transfer resistor may be performed. After the process of changing the curvature radius or the thickness is performed in the vicinity of the empty space provided inside the support, the process of changing the curvature radius in the vicinity of the empty space provided outside the edge of the support may be performed. After the process of changing the curvature radius or the thickness in the first portion of the heat transfer resistor is performed, the process of changing the curvature radius or the thickness in the second portion of the heat transfer resistor may be performed. The process of deforming the heat transfer resistor while the vacuum adiabatic body exhaust process is performed may also be applied to the plate, and the same description will be omitted.

The process associated with the heat transfer resistor may optionally include a process related to the process of washing the heat transfer resistor. An example of a process sequence associated with the process of washing the heat transfer resistor is as follows. The present disclosure may be any one of the following examples or a combination of two or more examples. After the process of manufacturing the heat transfer resistor is performed, at least one of the process of manufacturing the heat transfer resistor and the process of washing the heat transfer resistor may be performed. After the process of manufacturing the heat transfer resistor is performed, the process of washing the heat transfer resistor may be performed. Before the process of manufacturing the heat transfer resistor is performed, the process of washing the heat transfer resistor may be performed. After the process of manufacturing the heat transfer resistor is performed, at least one of a process of providing the component coupling portion to a portion of the heat transfer resistor or the process of washing the heat transfer resistor may be performed. After the process of providing the component coupling portion to a portion of the heat transfer resistor is performed, the process of washing the heat transfer resistor may be performed.

The process associated with the heat transfer resistor may optionally include a process related to the process of providing the component coupling portion to the heat transfer resistor. An example of a process sequence related to the process of providing the component coupling portion to the heat transfer resistor is as follows. The present disclosure may be any one of the following examples or a combination of two or more examples. After the process of providing the through-hole in a portion of the heat transfer resistor is performed, at least one of a process of providing a curved portion to the heat transfer resistor, a process of providing a curved portion to the tube, or a process of providing a seal between the heat transfer resistor and the tube may be performed. After the process of providing the curved portion to at least a portion of at least one of the heat transfer resistor or the tube is performed, the process of sealing the gap between the plate and the tube may be performed. The process of providing the through-hole in the portion of the heat transfer resistor and the process of providing the curved portion on at least one of the heat transfer resistor or the tube may be performed at the same time. The process of providing the through-hole in a portion of the heat transfer resistor and the process of providing the seal between the heat transfer resistor and the tube may be performed at the same time. After the process of providing the curved portion to the tube connected to the heat transfer resistor is performed, the process of providing the through-hole in the portion of the heat transfer resistor may be performed. Before the vacuum adiabatic body vacuum exhaust process is performed, a portion of the tube may be provided and/or sealed to the heat transfer resistor, and after the vacuum adiabatic body vacuum exhaust process is performed, the other portion of the tube may be sealed.

The process associated with the heat transfer resistor may optionally include a process related to the process of providing the heat transfer resistor on at least a portion of the plate. An example of a process sequence related to the process of providing the heat transfer resistor to at least a portion of the plate is as follows. The present disclosure may be any one of the following examples or a combination of two or more examples. Before the vacuum adiabatic body exhaust process is performed, the heat transfer resistor may be connected to at least one of the first plate or the second plate. Before the vacuum adiabatic body exhaust process is performed, the heat transfer resistor may be disposed in a heat conduction path, through which a fluid flows along the internal space. Before the vacuum adiabatic body exhaust process is performed, the heat transfer resistor may be provided in a space between the first plate and the second plate. Before the vacuum adiabatic body exhaust process is performed, the heat transfer resistor may be provided at the inside of the plate or the surface of the plate. Before the vacuum adiabatic body exhaust process is performed, the heat transfer resistor may be disposed to be supported by at least a portion of the plate. Before the vacuum adiabatic body vacuum exhaust process is performed, the heat transfer resistor may be disposed to be supported by the support.

When at least a portion of the heat transfer resistor is used to be integrated with the plate, the example of the process associated with the heat transfer resistor may also be applied to the example of the process of the plate.

Referring to FIG. 12, the vacuum adiabatic body according to the present invention includes a heat transfer path formed between the plates having different temperatures, and optionally, the heat transfer path may include a portion passing through the heat transfer resistor. An example of the heat transfer resistor as the heat transfer path is as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

Referring to FIG. 12a, the heat transfer resistor 60 may be provided on the first plate 10. The heat transfer resistor may be at least one of a radiation resistance sheet, a porous material, a filler, or a conductive resistance sheet. More preferably, the heat transfer resistor may be the conduction resistance sheet. A shield portion for thermal insulation or a member for reinforcing strength may be provided on an outer surface of the heat transfer resistor. The heat transfer resistor may be installed in two opposite peripheral portions of the vacuum space 50. The heat transfer resistor may be installed to be connected to two opposite edges of the vacuum space. Referring to FIG. 12b, the heat transfer resistor may be provided on the side plate. Referring to FIG. 12c, the heat transfer resistor may be provided on the second plate. In FIGS. 12b and 12c, the relationship between the plate and the heat transfer resistor is the same as that of FIG. 12a. Referring to FIG. 12d, the heat transfer resistor may be provided to be integrated with the first plate. In this case, the heat transfer resistor may be provided as the first plate or may be provided as a portion of the first plate. Referring to FIG. 12e, the heat transfer resistor may be provided to be integrated with the side plate. In this case, the heat transfer resistor may be provided as the side plate or as a portion of the first plate. Referring to FIG. 12f, the heat transfer resistor may be provided to be integrated with the second plate. In this case, the heat transfer resistor may be provided as the second plate or as a portion of the second plate.

The vacuum adiabatic body according to the present invention includes a heat transfer path formed between the plates having different temperatures, and optionally, the heat transfer path may include a portion passing through the side plate. An example of the side plate as the heat transfer path is as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates. FIGS. 12c and 12f may illustrate an example in which the first plate and the side plate are integrally provided. FIGS. 12a and 12d may illustrate an example in which the second plate and the side plate are integrally provided. FIGS. 12b and 12e may illustrate an example in which the side plate is provided as a separate component that is separated from the first plate and the second plate.

In one or more embodiments, the second plate 20 and the side plate 15 may be provided as one body. The second plate 20 and the side plate 15 may be provided by shaping a single plate material. The second plate 20 and the side plate 15 may be provided through sheet metal-working. A seal capable of causing vacuum breakage may not be provided at a boundary between the second plate 20 and the side plate 15. The seal may refer to a portion for coupling the two different plates. For example, the seal may be a welding portion. There may be no seal at a contact portion between the second plate 20 and the side plate 15. The seal may be removed to improve vacuum reliability of the vacuum adiabatic body. Since coupling and sealing between the two members is unnecessary, a production rate may increase.

FIG. 13 is a perspective view of the outer case, FIG. 14 is a front view (a) and a cross-sectional view (a) of the outer case, and FIG. 15 is an enlarged view of portion A of FIG. 13, i.e., an enlarged view of a corner section of the second plate, and a non-corner section adjacent to the corner section. The corner section 211 and the non-corner section 212 may be the same in each corner section 211 of the second plate 20 provided in a square shape.

In one or more embodiments, a first straight portion 221, a first curved portion 231, a third straight portion 223, a second curved portion 232, and a second straight portion 222 may be sequentially provided from top to bottom in a height direction (y-axis) of the vacuum space 50. The straight portion and the curved portion may be based on a shape of the second plate 20 in a cross-section (XY plane or YZ plane) in the height direction (y-axis) of the vacuum space 50. At least any portion of the straight portion may have a straight shape. At least any portion of the curved portion may have a curved shape.

At least a portion of the first straight portion 221 may correspond to a second portion 152 of the side plate. At least a portion of the third straight portion 223 may correspond to a first portion 151 of the side plate. At least a portion of the second straight portion 222 may correspond to a first portion 201 of the second plate. At least a portion of the first curved portion 231 may correspond to a space between the first straight portion 221 and the third straight portion 223. At least a portion of the second curved portion 232 may correspond to a space between the second straight portion 222 and the third straight portion 223.

Optionally, the non-corner section 212 and the corner section 211 may be provided in series in a longitudinal direction (X-axis) of the vacuum space 50. For example, a corner first curved portion 2311 that is the first curved portion 231 provided in the corner section 211 may be placed by being followed by a non-corner first curved portion 2312 that is the first curved portion 231 provided in the non-corner section 212. The corner section 211 and the non-corner section 212 may be provided in series in a depth direction (Z-axis) of the vacuum space 50. The alignment of the corner section 211 and the non-corner section 212 may be the same for other corner sections. For example, the non-corner first curved portion 2312 that is the first curved portion 231 provided in the non-corner section 212 may be placed by being followed by the corner first curved portion 2311 that is the first curved portion 231 provided in the corner section 211. This arrangement may be the same for other curved or straight portions.

Optionally, a thickness of at least a portion of the plurality of curved portions may have a maximum value in a thickness of the second plate 20. The thickness of any one of the plurality of curved portions may have a maximum thickness value among the respective portions of the second plate 20. The curved portion may be placed on a portion connecting the two straight portions to each other. Each of the two straight portions may be a member that transmits force in one direction. Bending stress may be concentrated on the curved portion. The concentrated bending stress may be stress that transmits force transmitted from any one of the two straight lines in the other direction. The concentrated bending stress may cause breakage of the curved portion. To correspond to the concentrated bending stress, the curved portion may be provided to be thicker than that of each of other portions of the outer case 210. For example, points j to o may be provided to be thicker than that of at least one of points b, f, t to y, and d.

A thickness of at least a portion of the first curved portion 231 may have a maximum thickness value among the portions of the second plate 20. The first curved portion 231 may connect the second portion 152 of the side plate to the first portion 151 of the side plate.

The second portion 152 of the side plate may be fixed by a jig when the second plate 20 and the first plate 10 are sealed to each other. During the sealing, the jig may hold the second portion 152 of the side plate. The second portion 152 of the side plate may support an entire load of the vacuum adiabatic body. The first curved portion 231 may be adjacent to a fixed end of the jig. Therefore, the first curved portion 231 may have the thickest thickness in the outer case 210.

The first straight portion 221 may be a portion to be gripped when assembling and transporting the vacuum adiabatic body. The first curved portion 231 may be a portion adjacent to the first straight portion 221. Therefore, the first curved portion 231 may have the thickest thickness in the second plate 20.

When sealing the first plate 10 and the second plate 20, the two members may be strongly clamped through the jig. Here, a curved shape of the first plate 10 may be deformed by an applied pressure. In this case, to absorb the deformation of the first plate 10, the first curved portion 231 may be provided to be the thickest in the second plate 20. To allow the first plate 10 and the second plate 20 to be in close contact with each other during the sealing, a vacuum pressure may be applied to the contact surface of the two cases. In this case, to absorb the deformation of the first plate 10, the first curved portion 231 may be provided to be the thickest in the second plate 20.

In one or more embodiments, the first straight portion 221 may have a portion extending into the additional adiabatic body 90. The first curved portion 231 may be provided to be the thickest in the second plate 20. When the additional adiabatic body 90 is mounted, the first straight portion 221 may sufficiently resist force received from the additional adiabatic body 90. For example, when foaming the urethane, an expansion pressure of the foaming urethane may apply force to the first straight portion 221. In this case, the first curved portion 231 may sufficiently support the force transmitted from the first straight portion 221. For this, the first curved portion 231 may be provided to be the thickest in the plate of the vacuum adiabatic body.

Optionally, the first curved portion 231 may be provided to be the thickest in the second plate 20. When the vacuum space 50 is exhausted, strong force due to a pressure difference may be applied to a point from which the first plate 10 and the second plate 20 are branched. The branching point of the first plate 10 and the outer case 210 may mean a point at which the contact between the first plate 10 and the second plate 20 is released. The first curved portion 231 may resist force according to the pressure difference. The ultrasonic wave may be provided to the point from which the plate 10 and the second plate 20 are branched, i.e., the first curved portion 231. The point from which the first plate 10 and the second plate 20 are branched may mean sealing that is permanent connection.

As described above, the first curved portion 231 may be provided to be the thickest in the second plate 20. Thus, it may prevent at least one of deformation of the first curved portion 231 itself, deformation of the first straight portion 221, relative movement between members, or distortion of the vacuum adiabatic body from occurring.

In one or more embodiments, the first curved portion 231 may include at least one of a first-1 curved portion 2321 adjacent to the first straight portion 221 or a first-2 curved portion 2322 adjacent to the third straight portion 223. The first-1 curved portion 2321 may have a curvature radius less than that of the first-2 curved portion 2322. The first-1 curved portion 2321 may be a portion adjacent to the first straight portion 221 and may directly receive large rotational moment. The first-1 curved portion 2321 may have a curvature radius less than that of the first-2 curved portion 2322 to correspond to the large rotational moment. The first-1 curved portion 2321 may be provided to be thicker than the first-2 curved portion 2322. The first-1 curved portion 2321 may be a portion adjacent to the first straight portion 221 and may receive large stress. For this reason, it may be provided to be thicker than the first-2 curved portion 2322. For example, the point h may have a curvature radius less than that of the point i. The point h may be provided to be thicker than the point i. Other curved portions may be provided to be the same.

In one or more embodiments, the thickness of the central portion of the first curved portion 231 may be greater than that of a peripheral portion of the first curved portion 231. Thus, the central portion of the first curved portion 231 subjected to the large stress may be more firmly reinforced. Here, the central portion may mean a central portion of the first curved portion in a height direction of the vacuum space of the outer case, that is, a XY plane or YZ plane of the outer case.

In one or more embodiments, in at least one of the plurality of curved portions, an amount of change in thickness per unit length in the corner section 211 may be greater than that of change in thickness per unit length in the non-corner section 212. Here, the unit length may be a unit length in the height direction of the vacuum space unit 50. In the corner section 211, an external impact may occur more frequently than in the non-corner section 212. The corner section 211 may be subjected to an external impact greater than that applied to the non-corner section 212. The corner section 211 may be a point at which the extension direction is changed, and stress may be concentrated. To respond to at least one of the external impact and/or concentrated stress, the change in thickness per unit length of the corner section 211 may be greater than the change in thickness per unit length of the non-corner section 212.

In the first curved portion 231, an amount of change in thickness per unit length in the corner section 211 may be greater than an amount of change in thickness per unit length in the non-corner section 212. For example, the change in thickness from the point k to the point n may be greater than that in thickness from the point p to the point q. Thus, it may withstand the external impact and/or concentrated stress on the first straight portion 221 of the corner section 211. The second straight portion 222 of the corner section 211 may be subjected to an external impact less than that applied to the first straight portion 221 of the corner section 211.

In one or more embodiments, in at least one of the plurality of curved portions, a thickness of the curved portion placed in the corner section 211 may be greater than that of the curved portion placed in the non-corner section 212. For example, the point k may be provided to be thicker than the point p. Thus, it may more smoothly respond to the external impact and concentrated stress concentrated to the corner section 211. The thickness of the corner first curved portion 2311 that is the corner section 211 of the first curved portion 231 may be provided to be thicker than the non-corner first curved portion 2312 that is the non-corner section 212 of the first curved portion 231.

The first curved portion 231 may include the thickest point in the second plate 20. The corner first curved portion 2311 may include the thickest point in the second plate 20. Thus, it may respond to the external impact and/or concentrated stress. The second curved portion 232 may include the thinnest point in the second plate 20. Thus, the point at which the number of times of external impact to be applied and/or the point at which the stress is dispersed may be thinned, and other portions may be reinforced. For example, the point k may be the thickest point, and the point n may be the thinnest point. The thickness of the first curved portion 231 may be thicker than that of the second curved portion 232. Thus, it may reinforce the portion to which the stress is concentrated. Here, each of the thickness of the first curved portion 231 and the thickness of the second curved portion 232 may be a mean thickness of each curved portion.

In one or more embodiments, the thickness of the first straight portion 221 may be greater than the thickness of the second straight portion 222. The thickness of the second straight portion 222 may be greater than the thickness of the third straight portion 223. The thickness of the first straight portion 221 may increase to prevent damage due to the clamping action of the jig. The third straight portion 223 may be an area to which a small load extending in the height direction of the vacuum space 50 is applied. Therefore, the third straight portion 223 may be provided to have the thinnest thickness in the straight portion. For example, the point b may be thicker than the point d, and the point d may be thicker than the point f. Here, the thickness of each of the first, second, and third straight portions may be a mean thickness of each of the straight portions.

In one or more embodiments, the first straight portion 221 may have the thickest point among the plurality of straight portions in the corner section 211. The first straight portion 221 of the corner section 211 may include the thickest point among the straight portions. Thus, it may respond to the external impact and/or concentrated stress. The second straight portion 222 of the corner section 211 may include the thinnest point among the plurality of straight portions. Thus, the point at which the number of times of external impact to be applied and/or the point at which the stress is dispersed may be thinned, and other portions may be reinforced. For example, the point b may be the thickest point among the plurality of straight portions, and the point f may be the thinnest point. In the corner section 211, the first straight portion 221 may be thicker than the second straight portion 222. Each of the thickness of the first straight portion 221 and/or the thickness of the second straight portion 222 may be a mean thickness of each straight portion.

The present disclosure may be any one of the following examples or a combination of two or more examples.

FIG. 16 is a view illustrates an embodiment of manufacturing the outer case.

Referring to FIG. 16, a base material that is a flat plate to be processed into the second plate 20 is seated on a first restriction frame 310. The base material may be provided in a rectangular shape. A peripheral portion of the base material may be pressed by a second restriction frame 320 and thus be fixed so as not to move vertically. The base material may be fixed without moving vertically between the first restriction frame 310 and the second restriction frame 320. Even when the first and second restriction frames 310 and 320 are restricted, the base material may move by a predetermined amount in a left and right direction. Here, the movement of the base material may include a stretching action.

In an inner region of the second restriction frame 320, the movable frame 330 may move downward to press the base material. The base material may be deformed to be in contact with at least one of the movable frame 330 and the first restriction frame 310. Here, the peripheral portion of the base material restricted by the first and second restriction frames 310 and 320 may move. Since the base material is deformed, it may process the base material into the shape of the second plate 20. When a displacement of the movable frame 330 is finished, the base material may become the second plate 20. When the displacement of the movable frame 330 is finished, the movable frame 330 and the first restriction frame 310 may be spaced a predetermined distance from each other. The base material may have the shape of the second plate 20 according to the distance.

In one or more embodiments, the first portion 151 of the side plate may be inclined at an angle from the first portion 201 of the second plate. The first portion 151 of the side plate may extend in a direction away from the second space. A side that is closer to the first space of the first portion 151 of the side plate may be farther from the central portion of the vacuum adiabatic body than a side that is closer to the second space of the first portion 151 of the side plate. The first portion 151 of the side plate may be wider at the side closer to the first space. The first portion 151 of the side plate may be provided to be narrower toward the bottom. The support 30 and/or the heat transfer resistor 32 may be guided from the first portion 151 of the side plate. The support 30 and the heat transfer resistor 32 may be inserted through the side closer to the first space. The support 30 and the heat transfer resistor 32 may be disposed to correspond to the width of the vacuum space in a longitudinal direction.

FIGS. 17 and 18 are views illustrate another embodiment of manufacturing the outer case.

Referring to FIG. 17, the base material may be fixed between the first restriction frame 310 and the second restriction frame 320. The peripheral portion of the base material may be exposed to the outside of the first and second restriction frames 310 and 320. The first movable frame 3301 may move upward to deform the peripheral portion of the base material. The first portion 151 of the side plate may be defined by the upward movement of the first movable frame 330. A portion to which the first and second restriction frames are fixed may be the first portion 201 of the second plate. When the first processing illustrated in FIG. 18 is finished, processing for providing the second portion 152 of the side plate may be additionally performed.

Referring to FIG. 18, a third restriction frame 3201 may be additionally installed outside the first portion 151 of the side plate. Thereafter, the base material may be expanded by pushing the second movable frame 3302 outward. The second portion 152 of the side plate may be provided by the action of the second movable frame 3302. During the deformation of the base material using the second movable frame 3302, there is a possibility that wrinkles occurs on a surface of the base material.

According to the manufacturing method of this embodiment, there are limitations that three restriction frames 310, 320, and 3201 and two movable frames 3301 and 3302 are required, the operation is cumbersome, and the movement and action of the restriction frame and the movable frame are difficult. According to the manufacturing method of this embodiment, when the thickness of the outer case is thick, it may obtain an advantage of providing a shape according to the design.

According to the manufacturing method according to the two foregoing embodiments, the action of extension and contraction may occur in the base material in response to the displacement of the movable frame. After the base material is manufactured as the outer case, the thickness may vary. The thickness of the outer case may be different before and after performing a vacuum adiabatic body component preparation process for providing the outer case as a component of the vacuum adiabatic body. After performing the vacuum adiabatic body component preparation process, a thickness of at least a portion of the plurality of curved portions may be the thickest on an entire area of the outer case.

When the vacuum adiabatic body component preparation process is performed, at least a portion of the plurality of curved portions may be thicker than the base material. Since the thickness increases compared to that of the base material, it may well withstand the external impact and/or concentrated stress. For example, when compared to the base material, the outer case may have a reduced thickness as a whole. However, the thickness may conversely increase at a specific point of the base material. For example, any point of at least a portion of the curved portion may have a maximum thickness in the outer case. For example, the corner first curved portion 2311 may have the thickest thickness in the outer cases.

The vacuum adiabatic body according to an embodiment may not have a separate conductive resistance sheet to be distinguished from other members at a side of the first plate 10. Since the conductive resistance sheet has an arcuate curvature, the conductive resistance sheet is vulnerable to breakage, and since the conductive resistance sheet is sealed to each of the first and second plates 10 and 20, there are problems in that many sealing portions are present, and that the sealing portions reduce a mass production speed, increase a risk of vacuum breakage, and reduce the vacuum reliability of the vacuum adiabatic body. In consideration of these problems, the first plate 10 may be manufactured as a single thin plate according to an embodiment of the present disclosure. The first plate 10 may be provided as a single stainless steel plate without a seal or the like.

The first portion 101 of the first plate may be in contact with the second portion 152 of the side plate. The first portion 101 of the first plate may extend in a longitudinal direction of the vacuum space 50. The second portion 152 of the side plate may extend in a longitudinal direction of the vacuum space 50. The first portion 101 of the first plate may extend away from the vacuum space 50. The second portion 152 of the side plate may extend away from the vacuum space 50.

The vacuum adiabatic body may include a plurality of straight portions as described above. The first portion 101 of the first plate may provide the first straight portion 221. The second portion 152 of the side plate may provide the first straight portion 221.

A portion of at least one of the plurality of straight portions, which is close to the center of the vacuum adiabatic body, may be thinned compared with a portion close to an edge of the vacuum adiabatic body. At least one of the plurality of straight portions may include a thickness change portion, a thickness of which is reduced toward a central portion of the vacuum adiabatic body from an edge of the vacuum adiabatic body. The thickness change portion may be insulated by the additional adiabatic body. According to the configuration, a straight portion adjacent to the central portion of the vacuum adiabatic body may be thinned, thereby effectively blocking heat conduction. Heat conducted to a periphery of the vacuum adiabatic body from the central portion of the vacuum adiabatic body may be more effectively blocked.

The first straight portion 221 may include a thickness change portion, a thickness of which is reduced toward the first curved portion 231. The thickness change portion may be may be positioned to be biased toward the first curved portion 231 from the center of the first straight portion 221. This configuration may have the following obvious advantages: the amount of heat conduction along the first plate 10 may be reduced. A function of the conductive resistance sheet of the first straight portion 221 may be strengthened. Since the first straight portion 221 is thinned, the flexibility of the plate member may be increased, and accordingly, fastening bonding force may be advantageously increased at a place at which the seal is placed. For sealing, a base material may have a thickness of at least an appropriate degree. When the thickness of the base material is excessively small, it may be difficult to control a heat source and the seal may be defective. When the first straight portion 221 is excessively thin, sealing failure such as seal penetration may occur and may lead to vacuum failure.

After the vacuum adiabatic body component preparation process is performed, the thickness of at least one of the plurality of straight portions may be reduced toward the first curved portion 231 from an edge of the vacuum adiabatic body. The first straight portion 221 may have a thickness that is changed before and after the vacuum adiabatic body component preparation process is performed. In the vacuum adiabatic body component preparation process, at least one of the straight portions may have a thickness that is reduced toward the first curved portion 231 from the edge of the vacuum adiabatic body. The first straight portion 221 may have a thickness that is changed in the vacuum adiabatic body component preparation process. As such, the first straight portion 221 may be conveniently molded.

In the first straight portion 221, at least a portion of the corner section 211 of a single body 210 may have a larger thickness than at least a portion of the non-corner section 212 of the single body 210. As such, when sealing is performed, a heating amount of the corner section 211 may be greater than a heating amount of the non-corner section 212. For example, a laser welding device may slowly rotate at the corner section 211. In this case, a hole may be formed through the first straight portion 221 by a large amount of heating. To prevent this, the corner section 211 may be reinforced to be thicker than the non-corner section 212 to prevent sealing failure.

FIG. 19 is a partial cross-sectional perspective view of the vacuum adiabatic body, FIG. 20 is a partial front view of the cross-sectional view of FIG. 19, and FIG. 21 is a partial cross-sectional view of the single body.

According to an embodiment, the single body 210 may provide the second plate 20 and the side plate 15 as a single body. Here, the single body may mean that two members configure one body without a coupler such as a seal. The single body 210 may provide the first portion 201 of the second plate, the first portion 151 of the side plate, and the second portion 152 of the side plate as a single body. There is no seal that causes vacuum break at a boundary between the second plate 20 and the side plate 15. The single body 210 may not require a portion at which the second plate 20 and the side plate 15 are sealed. Here, at least a portion of the single body 210 may be a member for providing a wall between the second portion and the vacuum space 50. The single body 210 may be processed to form an accommodation space. At least a portion of the single body 210 may be a member for providing a wall between the additional adiabatic body and the vacuum space 50.

The first plate 10 may be provided as a thin plate that is thinner than the second plate 20. The first plate 10 may be provided as a thin plate that is thinner than the side plate 15. The first plate 10 may be a conductive resistance sheet as a thin plate. The heat transfer resistor may be a conductive resistance sheet. The heat transfer resistor may refer to a sheet that resists heat conduction due to a small cross-sectional area in a direction of heat flow. The heat transfer resistor may be a metal plate with a small thickness. The first plate 10 may include a heat transfer resistor. The first plate 10 may configure a single body with the heat transfer resistor. The first plate 10 may be provided as a metal plate member with a small thickness.

The first plate 10 and the single body 210 may be formed of a stainless steel material. The first plate 10 may be coupled to the single body 210 at the second portion 152 of the side plate. At a contact portion between the first portion 101 of the first plate and the second portion 152 of the side plate, the first plate 10 may function as a heat transfer resistor. At the first portion 101 of the first plate adjacent to the second portion 152 of the side plate, the first plate 10 may function as a heat transfer resistor. The first plate 10 may be provided flat and long without a curved portion. The heat transfer resistor may be provided flat. The heat transfer resistor may not have an artificially processed curved portion except for a curved portion that is naturally contracted and deformed by vacuum pressure.

The heat transfer resistor may not have a curved portion. The heat transfer resistor may be provided as thin as 0.1 mm. The heat transfer resistor is significantly thin, and thus when the curved portion is artificially provided, the curved portion may be excessively thin and may be vulnerable to breakage. The curved portion may be damaged during the vacuum exhaust. Since an additional process such as a press is not required to further process the curved portion, it may be more convenient. Like in the embodiment, the curved portion may not be artificially processed, and the heat transfer resistor, that is, the first plate 10 may have a flat shape. A side of the first plate 10 may provide a heat transfer resistor.

The heat transfer resistor may be provided to the side of the first plate 10 instead of a side of the side plate 15. When the heat transfer resistor is provided on a side surface of the vacuum adiabatic body extending in a height direction of the vacuum space 50, a side load applied to the heat transfer resistor may become excessively large. Here, the side surface of the vacuum adiabatic body may refer to a surface on which the side plate 15 is placed. In this case, the heat transfer resistor may be in contact with the support 30, and thus a risk of breakage of the support 30 may increase. The side plate 15 of the vacuum adiabatic body may be provided as a single body with the single body 210 instead of the first plate 10. For example, the first plate 10 may be provided with a thickness of 0.1 mm, and the single body 210 may be provided with a thickness of 0.5 mm.

The second plate 20 and an extension direction A of the side plate 15 may form an obtuse angle. An internal space of the single body 210 may configure an accommodation space that is convex downward. The single body 210 may provide an accommodation space in the form of a basin. The accommodation space may provide the vacuum space 50. The support 30 may be conveniently accommodated upward and downward in an internal space provided by walls of the second plate 20 and the side plate 15. The side plate 15 may guide accommodation of the support 30.

The support 30 may be disposed adjacent to the side plate 15. The single body 210 may have a predetermined thickness. The single body 210 may not be deformed by vacuum pressure of the vacuum space 50. An interval between the support 30 and the side plate 15 may be shorter than the length of the first straight portion 221. The support 30 may maintain the internal between the first plate 10 and the second plate 20 to an edge of the vacuum space 50, and thus an outer wall structure of the vacuum space 50 may be formed more firmly. It may be possible to reduce deformation of the vacuum adiabatic body and damage of the first, second, or the side plate 15, which occurs in a periphery of a conventional heat transfer resistor.

FIG. 22 is a reference diagram for explaining a curvature of each member of a vacuum adiabatic body according to an embodiment.

Referring to FIG. 22, at least one of the first, second, and side plates 10, 20, and 15 may have a predetermined curvature for providing a vacuum adiabatic body. The positions of the first, second, and side plates 10, 20, and 15 will be described by respective capital letters of the alphabet.

"A" indicates the first curved portion 231. A radius of curvature of the first curved portion 231 may have an inner side of 1R and an outer side of 1.5R. Here, "R" is a dimensionless unit for comparison with a curvature in other areas. The first curved portion 231 may have a small radius of curvature for contact with the first plate 10 and formation of the vacuum space 50. However, the first curved portion 231 may have a radius of curvature proposed to prevent damage of the single body 210 and to ensure sufficient strength thereof.

"B" indicates the second curved portion 232. A radius of curvature of the second curved portion 232 may have an inner side of 1.5R and an outer side of 2.0R.

"C" may be a boundary portion between the second portion 202 and the third portion 203 of the second plate and a radius of curvature thereof may have an inner side of 4.5R and an outer side of 5R. The boundary portion may be a portion that forms an appearance, and the body may be in direct contact with the boundary portion, and thus the boundary portion may have a smooth curved surface for safety. The boundary portion may be bent in the XYZ triaxial direction, and thus a radius of curvature may be increased.

"D" is a curvature of an edge of the third portion 203 of the second plate. "D" is a portion bent toward the vacuum space 50. The radius of curvature of the edge may have an inner side of 1R and an outer side of 1.5R. A consumer may not be in direct contact with the edge. The first plate 10 may be in contact with the edge.

"E" indicates a curvature formed by partially supporting the first portion 101 of the first plate of the first plate 10 by the support 30.

"F" indicates a curvature formed by partially supporting the first portion 201 of the second plate of the single body 210 by the support 30. A radius of curvature of the first portion 101 of the first plate may be smaller than a radius of curvature of the first portion 201 of the second plate.

"G" indicates a curvature of the first plate 10 in a gap between the edge of the support 30 and the first straight portion 221. The curvature may be formed by vacuum pressure of the vacuum space 50. The curvature of "G" may be spread along the second portion 152 of the side plate.

A curvature of a portion "H" spaced apart from the portion "G" toward the edge of the second portion 152 of the side plate may be formed. The portion "H" may be a curvature due to at least one a thickness difference of the single body 210 and curvature spread of the portion "G". A radius of curvature of the portion "G" may be smaller than a radius of curvature of the portion "H". The radii of curvature of the portion of the portions G and H may be smaller than the radius of curvature of the portion "E".

Referring back to FIG. 15, in a height direction (the y-axis direction) of the vacuum space 50, the first straight portion 221, the first curved portion 231, the third straight portion 223, the second curved portion 232, and the second straight portion 222 may be sequentially provided from top to bottom. The straight portion and the curved portion may be based on a shape of the single body 210 in a sectional view in a height direction (the y-axis direction) of the vacuum space 50. With regard to the straight portion and the curved portion, at least a portion of the straight portion may be a straight line, and at least a portion of the curved portion may be a curved line.

At least a portion of the first straight portion 221 may correspond to the second portion 152 of the side plate. At least a portion of the third straight portion 223 may correspond to the first portion 151 of the side plate. At least a portion of the second straight portion 222 may correspond to the first portion 201 of the second plate. At least a portion of the first curved portion 231 may correspond to an interval between the first straight portion 221 and the third straight portion 223. At least a portion of the second curved portion 232 may correspond to an interval between the second straight portion 222 and the third straight portion 223.

The third straight portion 223 may be thinner than the first straight portion 221. The third straight portion 223 may be thinner than the second straight portion 222. The third straight portion 223 may be the thinnest among all straight portions provided in the single body. The first and second straight portions may be provided with the same thickness. The third straight portion 223 may be a heat transfer path, and thus may be provided as thin as possible to improve heat insulation performance. The third straight portion 223 may be protected by the additional adiabatic body 90 on a side surface of a vacuum space, and thus needs not be thick.

In any one longitudinal direction (the X-axis direction) or depth direction (the Z-axis direction) of the vacuum space 50, the non-corner section 212 and the corner section 211 may be sequentially provided. For example, subsequent to the non-corner first curved portion 2312 as the first curved portion 231 formed in the non-corner section 212, the corner first curved portion 2311 as the first curved portion 231 formed in the corner section 211 may be placed. In another longitudinal direction (the Z-axis direction) of the vacuum space 50, the corner section 211 and the non-corner section 212 may be sequentially provided. Alignment of the corner section 211 and the non-corner section 212 may also be the same as in another corner section 211. For example, subsequent to the corner first curved portion 2311 as the first curved portion 231 formed in the corner section 211, the non-corner first curved portion 2312 as the first curved portion 231 formed in the non-corner section 212 may be placed.

The first straight portion 221 may provide a sealing surface by a seal. The seal may be generated via laser welding. The laser welding may couple the plates to each other by heating the plates using a high power laser. In order to smoothly fuse the members using the laser welding, surfaces to be fused may be flat.

The third straight portion 223 may be placed at a connection part between the first curved portion 231 and the second curved portion 232. The side plate 15 may provide the third straight portion 223. The third straight portion 223 may include a thick portion and a thin portion. The third straight portion 223 may include a portion having a thickness that is reduced toward the second curved portion 232 from the first curved portion 231. The third straight portion 223 may include a first portion of the third straight portion 223, which has a large thickness. The first portion of the third straight portion 223 may be placed close to the first curved portion 231. The third straight portion 223 may include a second portion of the third straight portion 223, which has a small thickness. The second portion of the third straight portion 223 may be placed close to the second curved portion 232. The first portion of the third straight portion 223 may have a thickness larger than the second portion of the third straight portion 223. The first portion of the third straight portion 223 and the second portion of the third straight portion 223 may include a portion having a thickness that is reduced toward the second curved portion 232 from the first curved portion 231. A thin portion of the third straight portion 223 may include a part that acts as the center of rotation of a portion placed on the part of the thin portion of the third straight portion 223 during rotation of the portion placed on the part of the thin portion. The part that acts as the center of rotation is thinner than other regions, and thus may refer to a portion that is easily deformed by vacuum pressure of the vacuum space 50. As the vacuum pressure is increased, action of the center of rotation may be increased. The thin portion of the third straight portion 223 may be a lower portion of the third straight portion 223, a lower portion of the first portion of the third straight portion 223, or a lower portion of the second portion.

The third straight portion 223 may have at least a rotated and translated portion. A portion that is connected to the third straight portion 223 and extends toward the first curved portion 231 may have at least a rotated and translated portion. The rotated and translated portion may include the side plate 15. For example, when the side plate 15 is deformed, at least a portion of the side plate 15 may be in contact with the support 30. An internal surface of the side plate 15 may be in contact with an edge of a side surface of the support 30. By supporting and reinforcing actions of the side plate 15 and the support 30, the strength of the vacuum adiabatic body may be increased. The strength of an edge portion of the vacuum adiabatic body may be increased.

The third straight portion 223 may include the thinnest portion of the straight portion of the single body 210. Accordingly, rotational displacement of the side plate 15 may be sufficiently performed.

The thickness of the single body 210 may be different before and after performing the vacuum adiabatic body component preparation process for providing the single body 210 as a component of the vacuum adiabatic body. After the vacuum adiabatic body component preparation process is performed, the thickness of at least one of the plurality of straight portions may be changed in a longitudinal direction. When the vacuum adiabatic body component preparation process is performed, at least a portion of the plurality of the straight portions may be thinned in a longitudinal direction. As the portion of the plurality of the straight portions is thinned compared with the base material, the single body 210 may be allowed to be deformed to support adjacent members by each other. Thus, the structural strength of at least one of the edge portion of the vacuum adiabatic body or the entire vacuum adiabatic body may be increased.

In at least one of the plurality of straight portions, the thickness of the corner section 211 may be larger than the thickness of the non-corner section 212. The corner section 211 may be a portion on which external impact or load is concentrated. By providing a larger thickness of the corner section 211, the strength of the corner section 211 may be reinforced to more withstand external impact. The third straight portion 223 may have a larger thickness in the corner section 211 than a thickness in the non-corner section 212. The thickness change of the third straight portion 223 toward the first curved portion 231 or the second curved portion 232 may also be applied to at least one of the corner section 211 or the non-corner section 212 in the same way. As a result, in the third straight portion 223, a thickness of the corner section 211 may be larger than a thickness of the non-corner section 212. In the third straight portion 223 placed in the corner section 211, a portion adjacent to the second curved portion 232 may have a larger thickness in the corner section 211 than a thickness in the non-corner section 212.

At least one of the plurality of straight portions may have a larger thickness in the corner section 211 than a thickness in the non-corner section 212. The corner section 211 may be a portion on which heat transfer is concentrated in three directions. By providing a thin thickness in the corner section 211 to lower thermal conductivity, the corner section 211 may function as a heat transfer resistor. The third straight portion 223 may have a smaller thickness in the corner section 211 than a thickness in the non-corner section 212. The thickness change of the third straight portion 223 toward the first curved portion 231 or the second curved portion 232 may also be applied to at least one of the corner section 211 or the non-corner section 212 in the same way. As a result, in the third straight portion 223, a thickness in the corner section 211 may be smaller than a thickness in the non-corner section 212. In the third straight portion 223 placed in the corner section 211, a portion adjacent to the second curved portion 232 may have a smaller thickness in the corner section 211 than a thickness in the non-corner section 212.

In at least one of the plurality of straight portions, a thickness change per unit length in the corner section 211 may be smaller than a thickness change per unit length in the non-corner section 212. In the third straight portion 223, a thickness change per unit length in the corner section 211 in a height direction of the vacuum space 50 may be smaller than a thickness change per unit length in the non-corner section 212. When a thickness change of the third straight portion 223 in the corner section 211 is small, load may be more firmly supported. The corner section 211 may be a connection point of the two non-corner sections 212, and the two non-corner sections 212 may more firmly support the two the non-corner sections 212 using the connection point as a starting point.

A vacuum adiabatic body according to another embodiment will be described. The above embodiments may also be applied in the same way to other components.

The second straight portion 222 may extend to a central portion of the vacuum space 50 subsequent to the second curved portion 232. The second plate 20 may provide the third straight portion 223. The first straight portion 221 may include a thick portion and a thin portion. The second straight portion 222 may include a portion having a thickness that is reduced toward a periphery of a central portion of the vacuum space 50. The second straight portion 222 may have a thickness that is reduced toward the second curved portion 232. The thin portion of the second straight portion 222 may allow rotation of a portion extending to a periphery of the vacuum space 50 from the second straight portion 222. The thin portion of the second straight portion 222 is thinner than other regions, and thus may be easily deformed by vacuum pressure of the vacuum space 50. As the vacuum pressure is increased, the thin portion may be easily deformed and may function as the center of rotation and deformation for other portions. The thin portion may be easily deformed and may act as the center of rotation and deformation for other portions. The thin portion of the second straight portion 222 may act as the center of rotation and deformation of at least one of the second curved portion 232, the third straight portion 223, the first curved portion 231, or the first straight portion 221.

The side plate 15 may include the rotated and translated portion. The side plate 15 may include at least a portion of the second curved portion 232, the third straight portion 223, the first curved portion 231, and the first straight portion 221. For example, when the side plate 15 is deformed, at least a portion of the side plate 15 may be in contact with the support 30. The internal surface of the side plate 15 may be in contact with an edge of a side surface of the support 30. By at least one of the supporting and reinforcing actions of the side plate 15 and the support 30, the strength of the vacuum adiabatic body may be increased. The strength of an edge portion of the vacuum adiabatic body may be increased.

The second straight portion 222 may include the thinnest portion of the straight portion of the single body 210. Accordingly, rotational displacement of the side plate may be sufficiently performed.

The thickness of the single body 210 may be different before and after performing the vacuum adiabatic body component preparation process for providing the single body 210 as a component of the vacuum adiabatic body. After the vacuum adiabatic body component preparation process is performed, the thickness of at least one of the plurality of straight portions may be changed in a longitudinal direction. When the vacuum adiabatic body component preparation process is performed, at least a portion of the plurality of straight portion may be thinned toward the periphery of the vacuum space 50. As the portion of the plurality of the straight portions is thinned compared with the base material, the single body 210 may be allowed to be deformed to support adjacent members by each other. Thus, the structural strength of at least one of the edge portion of the vacuum adiabatic body or the entire vacuum adiabatic body may be increased.

At least one of the plurality of straight portions may include a portion having a thickness that is reduced toward the first curved portion 231. The second straight portion 222 may be thinned toward the first curved portion 231. A thickness in the corner section 211 may be smaller than a thickness in the non-corner section 212. The corner section 211 may be a portion on which heat transfer is concentrated in three directions. By providing a thin thickness in the corner section 211 to lower thermal conductivity, the corner section 211 may function as a heat transfer resistor. By reducing the thickness of the corner section 211, elastic restoring force of the corner section 211 may be increased to withstand external impact. The second straight portion 222 may have a smaller thickness in the corner section 211 than a thickness in the non-corner section 212. The second straight portion 222 may include a portion that is thinned toward the corner section 211 from the non-corner section 212, which may be more resistant to heat conduction.

In at least one of the plurality of straight portions, a thickness change per unit length in the corner section 211 may be smaller than a thickness change per unit length in the non-corner section 212. In the second straight portion 222, a thickness change per unit length in the corner section 211 in a height direction of the vacuum space 50 may be smaller than a thickness change per unit length in the non-corner section 212. When a thickness change of the second straight portion 222 in the corner section 211 is small, load may be more firmly supported. The corner section 211 may be a connection point of the two non-corner sections 212, and the two non-corner sections 212 may more firmly support the two the non-corner sections 212 using the connection point as a starting point.

INDUSTRIAL APPLICABILITY

The present disclosure may provide a vacuum adiabatic body applicable to a real life.

The invention claimed is:
1. A vacuum adiabatic body comprising:
a first plate;

a second plate spaced apart from the first plate to form a vacuum space in a height direction of the vacuum space between the first plate and the second plate; and a side plate configured to define a side of the vacuum space, wherein the first plate, the second plate, and the side plate include a plurality of straight portions;

wherein one of the plurality of straight portions includes a first section closer to a center of the vacuum adiabatic body than a second section which is closer to an edge of the vacuum adiabatic body than the first section, and the first section of the one of the plurality of straight portions is thinner than the second section of the one of the plurality of straight portions, and wherein the one of the plurality of straight portions includes a third section of a third thickness in a corner section of a surface perpendicular to the height direction and a fourth section of a fourth thickness in a non-corner section of the surface, the third thickness being smaller than the fourth thickness.

2. The vacuum adiabatic body of claim 1, comprising:
a thickness change portion having a thickness that is reduced from the edge of the vacuum adiabatic body toward a central portion of the vacuum adiabatic body.

3. The vacuum adiabatic body of claim 2, comprising:
an insulated foam body for insulating the thickness change portion.

4. The vacuum adiabatic body of claim 1, wherein the side plate and the second plate provide a first straight portion, a second straight portion below the first straight portion, a third straight portion between the first straight portion and the second straight portion, a first connector between the first straight portion and the third straight portion, and a second connector between the second straight portion and the third straight portion; and
wherein the first straight portion includes a section having a thickness that is reduced from the edge of the vacuum adiabatic body toward a first curved portion.

5. A vacuum adiabatic body comprising:
a first plate;
a second plate spaced apart from the first plate to form a vacuum space between the first plate and the second plate; and
a side plate configured to define a side of the vacuum space,
wherein the side plate and the second plate include a first straight portion, a second straight portion below the first straight portion, and a third straight portion between the first straight portion and the second straight portion; and
wherein the third straight portion includes a first portion including at least a rotated and translated section and a second portion including a part that acts as a center of rotation for the rotated and translated section, the part being relatively easily deformed by a vacuum pressure of the vacuum space.

6. The vacuum adiabatic body of claim 5,
wherein the side plate includes:
a first curved portion between the first straight portion and the third straight portion, and a second curved portion between the third straight portion and the second straight portion,
wherein a section of the third straight portion that extends toward the first curved portion has at least the rotated and translated section, and
wherein the section of the third straight portion contacts a support to maintain the vacuum space.

7. The vacuum adiabatic body of claim 5, wherein the first portion includes a thick section and the second portion includes a thin section.

8. The vacuum adiabatic body of claim 5, wherein the third straight portion has a thickness that is reduced from a first curved portion toward a second curved portion.

9. The vacuum adiabatic body of claim 5, wherein the side plate includes:
a first curved portion between the first straight portion and the third straight portion, and a second curved portion between the third straight portion and the second straight portion,
wherein the third straight portion includes the first portion and the second portion, the first portion is disposed closer to the first curved portion than the second portion, and the second portion is disposed closer to the second curved portion than the first portion, and
wherein the first portion of the third straight portion has a larger thickness than the second portion of the third straight portion.

10. The vacuum adiabatic body of claim 5, wherein one of the plurality of straight portions has a larger thickness at a corner section than at a non-corner section.

11. The vacuum adiabatic body of claim 5, wherein the side plate includes:
a first curved portion between the first straight portion and the third straight portion, and a second curved portion between the third straight portion and the second straight portion,
wherein in the third straight portion, a section adjacent to the second curved portion at a corner section has a larger thickness than a section adjacent to the second curved portion at a non-corner section.

12. The vacuum adiabatic body of claim 5, wherein in at least one of the plurality of straight portions, a thickness change per unit length at a corner section is smaller than a thickness change per unit length at a non-corner section.

13. The vacuum adiabatic body of claim 5, wherein, in the third straight portion, a thickness change per unit length at a corner section is smaller than a thickness change per unit length at a non-corner section.

14. The vacuum adiabatic body of claim 5,
wherein the second straight portion has at least a rotated and translated portion.

15. The vacuum adiabatic body of claim 14, wherein the second straight portion has a thickness that is reduced from a central section toward a periphery.

16. The vacuum adiabatic body of claim 14, wherein a portion of the second straight portion at a corner section has a smaller thickness than a portion of the second straight portion at a non-corner section.

17. The vacuum adiabatic body of claim 14, wherein the second straight portion has a thickness that is reduced from a non-corner section toward a corner section.

18. A vacuum adiabatic body comprising:
a first plate;
a second plate spaced apart from the first plate to form a vacuum space between the first plate and the second plate;
a side plate configured to define a side of the vacuum space; and
an insulated foam body to connect to the first plate and the second plate,
wherein the side plate and the second plate provide a first straight portion, a second straight portion below the first straight portion, a third straight portion between the first straight portion and the second straight portion, a first connector between the first straight portion and the third straight portion, and a second connector between the second straight portion and the third straight portion; and wherein the first straight portion includes a section having a thickness that is reduced from an edge of the vacuum adiabatic body toward a first curved portion.

19. The vacuum adiabatic body of claim 18, wherein one of the plurality of straight portions includes a first section closer to a center of the vacuum adiabatic body than a second section which is closer to the edge of the vacuum adiabatic body than the first section, and the first section is thinner than the second section.

20. The vacuum adiabatic body of claim 18, wherein the third straight portion includes a rotated and translated section.

* * * * *